United States Patent
Seol et al.

(10) Patent No.: US 10,476,081 B2
(45) Date of Patent: Nov. 12, 2019

(54) POSITIVE ELECTRODE MATERIAL MIXTURE AND SECONDARY BATTERY INCLUDING THE SAME

(71) Applicant: LG Chem, Ltd., Seoul (KR)

(72) Inventors: Jong Heon Seol, Daejeon (KR); Ye Lin Kim, Daejeon (KR); Sang Hoon Choy, Daejeon (KR)

(73) Assignee: LG Chem, Ltd. (KR)

( * ) Notice: Subject to any disclaimer, the term of this patent is extended or adjusted under 35 U.S.C. 154(b) by 178 days.

(21) Appl. No.: 15/567,853

(22) PCT Filed: Jun. 10, 2016

(86) PCT No.: PCT/KR2016/006218
§ 371 (c)(1),
(2) Date: Oct. 19, 2017

(87) PCT Pub. No.: WO2016/200223
PCT Pub. Date: Dec. 15, 2016

(65) Prior Publication Data
US 2018/0159131 A1    Jun. 7, 2018

(30) Foreign Application Priority Data

Jun. 12, 2015  (KR) .................. 10-2015-0083509
Jun. 10, 2016  (KR) .................. 10-2016-0072730

(51) Int. Cl.
*H01M 4/62*    (2006.01)
*H01M 10/0525*    (2010.01)
(Continued)

(52) U.S. Cl.
CPC .......... *H01M 4/622* (2013.01); *H01M 4/623* (2013.01); *H01M 4/625* (2013.01);
(Continued)

(58) Field of Classification Search
CPC ........ H01M 4/622; H01M 4/13; H01M 4/623; H01M 4/625; H01M 4/505; H01M 4/525; H01M 10/052
See application file for complete search history.

(56) References Cited

U.S. PATENT DOCUMENTS 8,906,549 B1    12/2014  Palazzo
2013/0017340 A1   1/2013  Brown et al.
(Continued)

FOREIGN PATENT DOCUMENTS

JP    2000208147 A    7/2000
JP    2013218895 A    10/2013
(Continued)

OTHER PUBLICATIONS

Extended European Search Report for Application No. EP16807863.2 dated Apr. 6, 2018.
(Continued)

*Primary Examiner* — Helen Oi K Conley
(74) *Attorney, Agent, or Firm* — Lerner, David, Littenberg, Krumholz & Mentlik, LLP

(57) ABSTRACT

Provided are a positive electrode material mixture, in which, the positive electrode material mixture includes a positive electrode active material, a conductive agent, and a binder, wherein the conductive agent includes a particulate conductive agent, a fibrous conductive agent, and a plate-shaped conductive agent, and the binder includes a crystalline binder having a weight-average molecular weight (Mw) of 500,000 g/mol to 900,000 g/mol and an amorphous binder having a weight-average molecular weight (Mw) of 200,000 g/mol to 400,000 g/mol.

20 Claims, 12 Drawing Sheets

(51) Int. Cl.
　　　*H01M 4/505*　　　(2010.01)
　　　*H01M 4/525*　　　(2010.01)
　　　*H01M 4/02*　　　(2006.01)

(52) U.S. Cl.
　　　CPC ........ H01M 10/0525 (2013.01); *H01M 4/505* (2013.01); *H01M 4/525* (2013.01); *H01M 2004/028* (2013.01)

(56) References Cited

U.S. PATENT DOCUMENTS

| | | |
|---|---|---|
| 2013/0170099 A1 | 7/2013 | Lee et al. |
| 2015/0083975 A1 | 3/2015 | Yeou et al. |
| 2015/0125752 A1 | 5/2015 | Nishimura et al. |

FOREIGN PATENT DOCUMENTS

| | | |
|---|---|---|
| JP | 2013222681 A | 10/2013 |
| JP | 2015053249 A | 3/2015 |
| JP | 2018022691 A | 2/2018 |
| KR | 101103198 B1 | 1/2012 |
| KR | 101287676 B1 | 8/2013 |
| KR | 20140070258 A | 6/2014 |
| KR | 20140099715 A | 8/2014 |
| KR | 20150033439 A | 4/2015 |

OTHER PUBLICATIONS

Search report from International Application No. PCT/KR2016/006218, dated Sep. 12, 2016.

ated positive electrode collector. However, since the positive electrode active material and the conductive agent are typically used in the form of powder, miscibility with the solvent is low when the positive electrode active material and the conductive agent are collectively added to the solvent and mixed, and thus, the positive electrode active material and the conductive agent may be non-uniformly dispersed in the positive electrode slurry. In a case in which a positive electrode active material layer is formed by coating the positive electrode collector with the positive electrode slurry in which components, such as the positive electrode active material and the conductive agent, are non-uniformly dispersed as described above, uniform coating on the positive electrode collector is difficult, and, as a result, the positive electrode active material layer having low thickness uniformity or surface defects is formed to reduce battery performance and life characteristics.

POSITIVE ELECTRODE MATERIAL MIXTURE AND SECONDARY BATTERY INCLUDING THE SAME

CROSS-REFERENCE TO RELATED APPLICATIONS

The present application is a national phase entry under 35 U.S.C. 0371 of International Application No. PCT/KR2016/006218, filed on Jun. 10, 2016, which claims the benefit of Korean Patent Application Nos. 10-2015-0083509, filed on Jun. 12, 2015, and 10-2016-0072730, filed on Jun. 10, 2016, in the Korean Intellectual Property Office, the disclosures of which are incorporated herein in their entirety by reference.

TECHNICAL FIELD

The present invention relates to a positive electrode material mixture, which exhibits excellent lithium ion conductivity and low resistance characteristics by including a developed pore structure and an electrically conductive network and may improve low-temperature output characteristics and high-temperature storage characteristics when used in a battery, and a secondary battery including the same.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

In a lithium secondary battery, a positive electrode is prepared by coating a positive electrode collector with a positive electrode slurry, which is prepared by collectively mixing a positive electrode active material, a conductive agent, and a binder with a solvent, and then drying the coated positive electrode collector. However, since the positive electrode active material and the conductive agent are typically used in the form of powder, miscibility with the solvent is low when the positive electrode active material and the conductive agent are collectively added to the solvent and mixed, and thus, the positive electrode active material and the conductive agent may be non-uniformly dispersed in the positive electrode slurry. In a case in which a positive electrode active material layer is formed by coating the positive electrode collector with the positive electrode slurry in which components, such as the positive electrode active material and the conductive agent, are non-uniformly dispersed as described above, uniform coating on the positive electrode collector is difficult, and, as a result, the positive electrode active material layer having low thickness uniformity or surface defects is formed to reduce battery performance and life characteristics.

Also, with respect to the conductive agent, since the conductive agent is used as fine particles of a few tens of nanometers (nm), cohesion is strong, and thus, agglomeration of the fine conductive agent particles may easily occur when the conductive agent particles are dispersed in the solvent. Accordingly, when the non-uniform dispersion of the conductive agent in the composition occurs, an effect of improving conductivity in the positive electrode active material layer becomes insufficient.

Furthermore, in a case in which non-uniform dispersion of the binder in the positive electrode slurry occurs, non-uniformity in adhesive strength of the positive electrode active material layer with respect to the positive electrode collector may occur during the preparation of the positive electrode, and, as a result, the positive electrode active material layer may be separated from the positive electrode collector and exfoliated. In this case, the exfoliation may not only significantly reduce the battery performance itself, but may also be a cause of reducing the life characteristics of the battery.

Thus, uniform dispersion of the components in the composition for forming a positive electrode as well as the development of battery components having excellent characteristics is important to improve the battery performance and life characteristics.

DISCLOSURE OF THE INVENTION

Technical Problem

An aspect of the present invention provides a positive electrode material mixture which exhibits excellent lithium ion conductivity and low resistance characteristics by including an electrically conductive network as well as a pore structure developed by a conductive agent uniformly dispersed over the entire positive electrode material mixture and may improve low-temperature output characteristics and high-temperature storage characteristics when used in a battery.

Another aspect of the present invention provides a positive electrode, a lithium secondary battery, a battery module, and a battery pack which include the positive electrode material mixture.

Technical Solution

According to an aspect of the present invention, there is provided a positive electrode material mixture including: a positive electrode active material, a conductive agent, and a binder, wherein the conductive agent includes a particulate conductive agent, a fibrous conductive agent, and a plate-shaped conductive agent, and the binder includes a crystalline binder having a weight-average molecular weight of 500,000 g/mol to 900,000 g/mol; and an amorphous binder having a weight-average molecular weight of 200,000 g/mol to 400,000 g/mol.

According to another aspect of the present invention, there is provided a positive electrode for a lithium secondary battery which includes the above-described positive electrode material mixture.

According to another aspect of the present invention, there is provided a lithium secondary battery including the positive electrode, a battery module including the above-described lithium secondary battery as a unit cell, and a battery pack including the battery module.

Advantageous Effects

A positive electrode material mixture according to the present invention may have a pore structure developed by a conductive agent uniformly dispersed over the entire positive electrode material mixture and may exhibit excellent lithium ion conductivity. As a result, the positive electrode material mixture may improve low-temperature output characteristics and high-temperature storage characteristics when used in a battery. Accordingly, the positive electrode material mixture according to the present invention is suitable for a positive electrode material mixture of batteries requiring high output, long lifetime, and storage stability, such as batteries for automobiles or batteries for power tools, particularly, batteries requiring the minimization of performance degradation at a high voltage, such as the batteries for automobiles.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
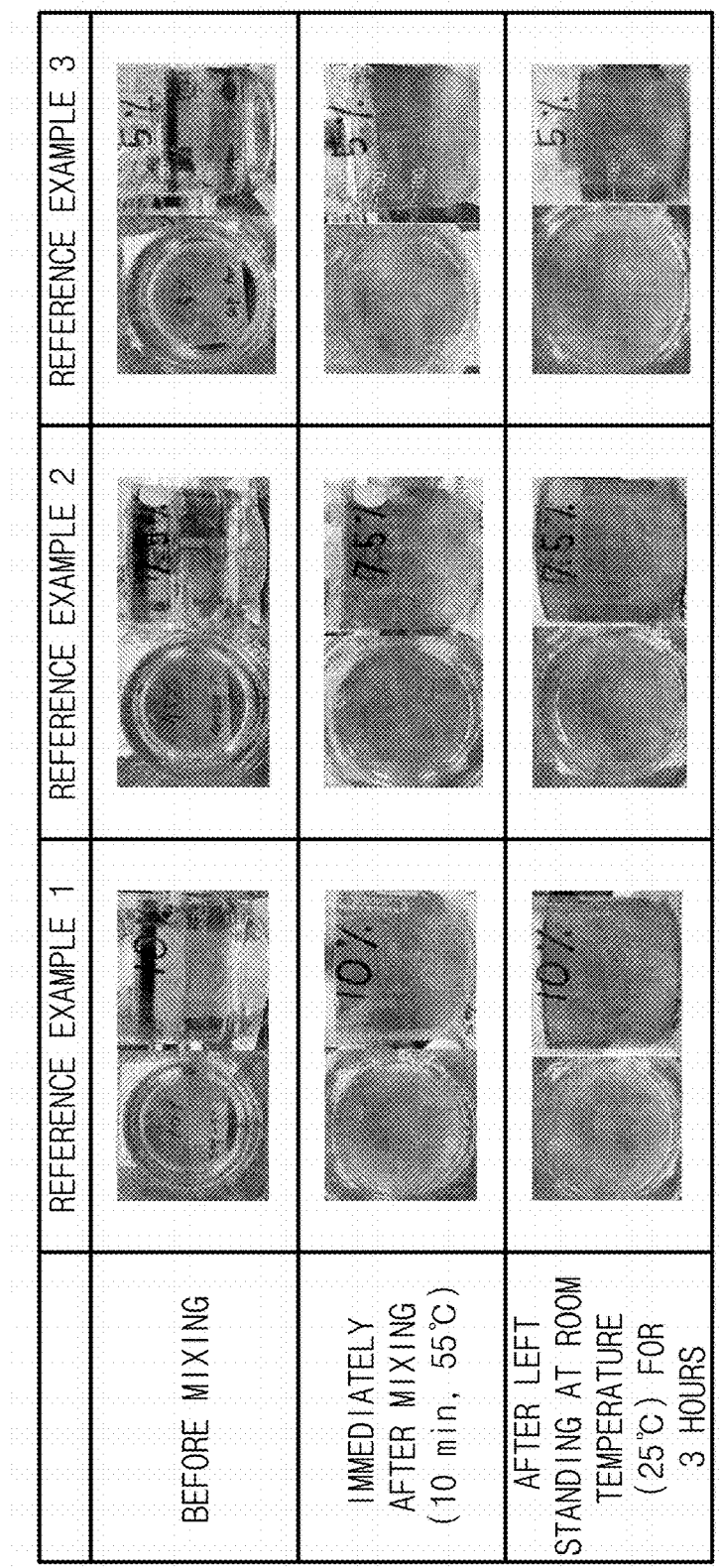
FIG. 1 is photographs showing miscibility according to a mixing ratio of crystalline binder to amorphous binder in Reference Examples 1 to 3.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the present invention, a numerical value, such as a particle diameter, an aspect ratio, or a specific surface area, of components constituting a positive electrode material mixture, specifically, a conductive agent, a binder, and a positive electrode active material, is an average value unless specifically mentioned otherwise.

Also, in the present invention, the positive electrode material mixture is a composition including the positive electrode active material, the conductive agent, and the binder, and further selectively including a solvent, wherein the positive electrode material mixture may be mixed solid-phase powder or a slurry phase in which the above-described components are dispersed and/or dissolved in the solvent. Furthermore, the positive electrode material mixture may be a structure, such as a layer, a thin film, or a film, which is formed by a process such as coating and drying.

In a positive electrode material mixture typically composed of a positive electrode active material, a conductive agent, and a binder, since conductivity of the positive electrode active material itself is low, resistance characteristics of the positive electrode material mixture is improved by increasing an amount of the conductive agent. However, in a case in which a particle size or surface area difference between the components generally mixed is large, particles having a small surface area are concentrated on any one component having a large surface area. Normally, an average particle diameter of the conductive agent used in the preparation of the positive electrode material mixture is in a range from a few tens to a few hundreds of nanometers (nm), which is much smaller than a few tens of micrometers (μm), an average particle diameter ($D_{50}$) of the positive electrode active material. As a result, the conductive agent is not uniformly dispersed between positive electrode active material particles, but is likely to be agglomerated or concentrated in any one part. In a case in which the conductive agent is non-uniformly dispersed as described above, the conductivity may be reduced by development of resistance. Since such a phenomenon is not changed even if the amount of the conductive agent is continuously increased, this may be the main cause of problem in a mixing process, for example, excess solvent use.

During the preparation of the positive electrode material mixture, since the mixture of the conductive agent and the binder is disposed on at least a portion of a surface of the positive electrode active material and the binder maintains the electrolyte component supplied from the outside when used in the electrode, a good reaction interface is formed by three phases of the electrode active material, conductive agent, and electrolyte components. In this case, electron supply at the three-phase interface of the electrode active material, the conductive agent, and the electrolyte is increased as the particle diameter of the conductive agent used is small and its specific surface area is large, and thus, improved reactivity may be exhibited. Also, in a case in which the particle diameter of the conductive agent used is large and the conductive agent has shape anisotropy, a conductive network may be easily formed in the positive electrode material mixture, and, since the conductive agent may act as a spacer, it is advantageous to secure pores between the positive electrode active material particles.

In the present invention, since three or more types of conductive agents having shape anisotropy are mixed and used, the formation of the three-phase interface of the positive electrode active material, the conductive agent, and the electrolyte is facilitated to increase the reactivity, and excellent pore characteristics are provided by allowing the pores between the positive electrode active material particles to be maintained while securing the conductivity between the positive electrode active material particles. Simultaneously, since two types of binders having different crystallinities and molecular weights are mixed and used, the binders allow the conductive agent to be uniformly dispersed in the positive electrode material mixture while maintaining excellent adhesion performance, and thus, electrical conductivity of a positive electrode may be improved and low-temperature output characteristics and high-temperature storage characteristics may be improved when used in a battery.

That is, the positive electrode material mixture according to an embodiment of the present invention includes a positive electrode active material, a conductive agent, and a binder, wherein the conductive agent includes a particulate conductive agent, a fibrous conductive agent, and a plate-shaped conductive agent, and the binder includes a crystalline binder having a weight-average molecular weight (Mw) of 500,000 g/mol to 900,000 g/mol; and an amorphous binder having a weight-average molecular weight (Mw) of 200,000 g/mol to 400,000 g/mol.

Specifically, in the positive electrode material mixture according to the embodiment of the present invention, the conductive agent includes three types of conductive agents having different shapes such as particulate, fibrous, and plate shapes.

In the conductive agent, the particulate conductive agent may be more favorably in contact with the surface of the positive electrode active material in comparison to the fibrous and plate-shaped conductive agents due to its unique shape, and its contact area is also wide. As a result, an effect of improving the conductivity of the positive electrode active material is significant in comparison to the fibrous and plate-shaped conductive agents, and it is more advantageous to form the three-phase interface between the positive electrode active material and the electrolyte. Accordingly, the contact and contact area of the particulate conductive agent with the positive electrode active material may be further increased by controlling particle diameter and specific surface area of the particulate conductive agent, and, as a result, conductivity and three-phase interface formation property may be significantly improved. Specifically, the particulate conductive agent usable in the present invention may be primary particles having an average particle diameter ($D_{50}$) of 10 nm to 45 nm and a specific surface area of 40 $m^2/g$ to 170 $m^2/g$, and may be secondary particles in which the plurality of primary particles are agglomerated. In a case in which the conductive agent is the secondary particles, the secondary particles are allowed to be dispersed as the primary particles when dispersed in the solvent. Since the particulate conductive agent has a small particle diameter and a large specific surface area which satisfy the above-described ranges, the contact with the positive electrode active material is facilitated and the contact area is increased to increase electron supply ability at the three-phase interface between the positive electrode active material and the electrolyte, and thus, the reactivity may be improved. If the average particle diameter of the particulate conductive agent is less than 10 nm or the specific surface area is greater than 170 $m^2/g$, dispersibility in the positive electrode material mixture is significantly reduced due to the agglomeration of the particulate conductive agent, and, if the average particle diameter is greater than 45 nm or the specific surface area is less than 40 $m^2/g$, since its diameter is excessively large, the particulate conductive agent may not be uniformly dispersed over the entire positive electrode material mixture, but may be partially concentrated in the arrangement of the conductive agent according to porosity of the positive electrode active material. In consideration of the significant effect of the average particle diameter and specific surface area of the particulate conductive agent on the reactivity of the positive electrode material mixture, the particulate conductive agent, for example, may have an average particle diameter ($D_{50}$) of 30 nm to 45 nm and a specific surface area of 40 $m^2/g$ to 120 $m^2/g$. Also, in the present invention, the specific surface area of the conductive agent may be defined as a value (Brunauer-Emmett-Teller (BET) specific surface area) measured by a nitrogen adsorption method.

In the present invention, the average particle diameter ($D_{50}$) of the conductive agent may be defined as a particle diameter at 50% in a cumulative particle diameter distribution. For example, the average particle diameter ($D_{50}$) of the conductive agent may be measured by using a laser diffraction method. Specifically, the conductive agent is dispersed in a solution, the solution is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

The particulate conductive agent may be used without particular limitation as long as it satisfies a morphological condition while having conductivity, but the conductive agent may be a non-graphite-based carbon material in consideration of the excellent improvement effect due to the use of the particulate conductive agent. Specifically, the particulate conductive agent may include carbon black, acetylene black, Ketjen black, channel black, furnace black, lamp black, thermal black, or Denka black, and any one thereof or a mixture of two or more thereof may be used.

Also, in the conductive agent, the fibrous conductive agent may specifically have an aspect ratio of greater than 1. In the present invention, the aspect ratio denotes a ratio of a length of a major axis passing through the center of the fibrous conductive agent to a diameter of a cross section perpendicular to the major axis and including the center of the fibrous conductive agent (=ratio of length/diameter), wherein, in a case in which the aspect ratio is 1, it has a spherical shape and, in a case in which the aspect ratio is greater than 1, it has a shape such as a fibrous shape. Since the fibrous conductive agent has such a specific shape, the fibrous conductive agent may provide elasticity to a space between the particles and may easily form the conductive network in the positive electrode material mixture.

In order to significantly improve the effect according to the present invention, the fibrous conductive agent may have an aspect ratio of 20 to 100 in addition to fibrous morphological characteristics. In a case in which the fibrous conductive agent is used with the above-described particulate conductive agent, the fibrous conductive agent is disposed between the space between the positive electrode active material particles and the particulate conductive agent is efficiently disposed in the remaining space, and thus, the conductive agents may be uniformly dispersed and distributed without being concentrated in only one part of the positive electrode active material. Furthermore, since the fibrous conductive agent may also be disposed on a contact portion between the positive electrode active material particles, the conductivity may be further improved. As a result, since electrical conductivity of the positive electrode material mixture is increased and resistance is reduced, an effect of improving rate capability and capacity retention of the battery may be obtained. If the aspect ratio of the fibrous conductive agent is less than 20, since electron conductivity in a longitudinal direction of the conductive agent is decreased, it is difficult to maintain the electrical network between the positive electrode active material particles, and, as a result, cycle characteristics may be reduced. Also, in a case in which the aspect ratio of the fibrous conductive agent is greater than 100, uniform dispersion in the positive electrode material mixture may be difficult. Specifically, in consideration of the use of the conductive agent having a specific shape and the significant effect according to the control of the aspect ratio, the fibrous conductive agent may have an aspect ratio of 20 to 60.

The fibrous conductive agent may be used without particular limitation as long as it satisfies a morphological condition while having conductivity, but the conductive agent may be a carbon-based material in consideration of the formation of the conductive network in the positive electrode material mixture according to the use of the fibrous conductive agent and the resulting excellent effect of improving the electrical conductivity. Specifically, the fibrous conductive agent may include carbon nanorods, carbon nanotubes, or carbon nanofibers which satisfy the above-described aspect ratio condition, and any one thereof or a mixture of two or more thereof may be used.

Specifically, the fibrous conductive agent may be carbon nanotubes having a hollow formed inside thereof, and, for example, may be carbon nanotubes having a diameter of 100 nm to 200 nm and a length of 3 μm to 10 μm while satisfying the above-described aspect ratio condition. When the carbon nanotubes satisfy the above-described diameter and length conditions and the aspect ratio condition at the same time, the electrically conductivity network may be easily formed without worrying about the non-uniform dispersion in the positive electrode material mixture. Specifically, in consideration of the significant improvement effect due to the control of the diameter and length of the carbon nanotubes, the carbon nanotubes may have a diameter of 120 nm to 180 nm and a length of 5 μm to 10 μm.

Also, the carbon nanotubes may have a specific surface area of 5 $m^2/g$ to 30 $m^2/g$ while satisfying the above-described diameter and length conditions and furthermore, the aspect ratio condition. When the specific surface area of the carbon nanotubes is less than 5 $m^2/g$, the improvement effect may be insignificant due to a decrease in reaction area, and, when the specific surface area is greater than 30 $m^2/g$, the formation of the conductive network may be difficult. Specifically, in consideration of the significant improvement effect due to the control of the specific surface area of the carbon nanotubes, the carbon nanotubes may have a specific surface area of 10 $m^2/g$ to 20 $m^2/g$.

Specifically, in consideration of the significant improvement effect due to the control of the diameter, length, aspect ratio, and specific surface area of the carbon nanotubes at the same time, the carbon nanotubes may have a diameter of 120 nm to 180 nm, a length of 5 μm to 10 μm, and a specific surface area of 10 $m^2/g$ to 20 $m^2/g$ under the condition satisfying the above-described aspect ratio range.

The carbon nanotubes may specifically include single-walled, double-walled, or multi-walled carbon nanotubes, and any one thereof or a mixture of two or more thereof may be used.

Also, the fibrous conductive agent may specifically be carbon nanofibers, and, for example, may be carbon nanofibers having a diameter of greater than 200 nm and equal to or less than 400 nm and a length of greater than 10 μm and equal to or less than 40 μm while satisfying the above-described aspect ratio condition. When the carbon nanofibers satisfy the above-described diameter and length and the aspect ratio at the same time, the electrically conductivity network may be easily formed without worrying about the non-uniform dispersion in the positive electrode material mixture. Specifically, in consideration of the significant improvement effect due to the control of the diameter and length of the carbon nanofibers, the carbon nanofibers may have a diameter of 250 nm to 400 nm and a length of 20 μm to 40 μm.

Furthermore, the carbon nanofibers may have a specific surface area of 2 $m^2/g$ to 20 $m^2/g$ while satisfying the above-described diameter and length conditions and furthermore, the aspect ratio condition. When the specific surface area of the carbon nanofibers is less than 2 $m^2/g$, uniform dispersion in the positive electrode material mixture is not easy, and, when the specific surface area is greater than 20 $m^2/g$, the formation of the conductive network may be difficult. Specifically, in consideration of the significant improvement effect due to the control of the specific surface area of the carbon nanofibers, the carbon nanofibers may have a specific surface area of 5 $m^2/g$ to 20 $m^2/g$.

Specifically, in consideration of the significant improvement effect due to the control of the diameter, length, aspect ratio, and specific surface area of the carbon nanofibers at the same time, the carbon nanofibers may have a diameter of 250 nm to 400 nm, a length of 20 μm to 40 μm, and a specific surface area of 5 $m^2/g$ to 20 $m^2/g$ under the condition satisfying the above-described aspect ratio range.

Also, in the conductive agent, the plate-shaped conductive agent plays a role in increasing the contact area of the fibrous conductive agent, wherein the plate-shaped conductive agent in the present invention, as a conductive agent having an aggregate structure in which two sides corresponding or opposite to each other are flat and a size in a horizontal direction is larger than a size in a vertical direction, may have a shape similar to a plate shape, such as a flake shape and a scaly shape, as well as a complete plate shape.

Specifically, the plate-shaped conductive agent may have a ratio of a diameter of a cross section, which is parallel to the two flat sides corresponding or opposite to each other and includes the center of the plate-shaped conductive agent, to a thickness of the plate-shaped conductive agent (=diameter/thickness) of 2 to 400. When the plate-shaped conductive agent having the above-described size range is mixed and used with the above-described particulate and fibrous conductive agents, the conductive network may be easily formed in the positive electrode material mixture and the pore characteristics may be well maintained. Specifically, in consideration of the significant effect due to the mixed use of the plate-shaped conductive agent and the control of its particle size, the plate-shaped conductive agent may have a ratio of the diameter to the thickness of 10 to 200.

In the present invention, the expression "diameter" of the plate-shaped conductive agent denotes the longest length among lengths of lines connecting two points in a closed curve formed by a circumference of a flat side. In this case, the expression "closed curve" denotes a curve in which a point on the curve moves in one direction and returns to a starting point again. Also, the expression "thickness" of the plate-shaped conductive agent denotes an average length between the two flat sides.

Furthermore, the plate-shaped conductive agent may have a particle size distribution in which $D_{50}$ is in a range of 2 μm to 4 μm and $D_{90}$ is in a range of 10 μm to 15 μm. When the plate-shaped conductive agent has the above-described particle size distribution, more uniform distribution in the positive electrode material mixture is possible, and, as a result, the electrical conductivity of the positive electrode material mixture may be improved and resistance characteristics of the positive electrode may be reduced. Specifically, in consideration of the excellent improvement effect due to the use of the plate-shaped conductive agent and the control of the particle size distribution, the plate-shaped conductive agent may have a particle size distribution in which $D_{50}$ is in a range of 3 μm to 4 μm and $D_{90}$ is in a range of 10 μm to 13 μm.

Also, the plate-shaped conductive agent may include a plurality of pores, and, accordingly, the plate-shaped conductive agent may have a large specific surface area. Specifically, the plate-shaped conductive agent may have a specific surface area of 200 $m^2/g$ to 400 $m^2/g$, and, since the plate-shaped conductive agent has the above-described specific surface area range, it is more advantageous to form the three-phase interface between the positive electrode active material and the electrolyte. Specifically, in consideration of the excellent improvement effect due to the use of the plate-shaped conductive agent and the control of the specific surface area, the plate-shaped conductive agent may have a specific surface area of 200 $m^2/g$ to 260 $m^2/g$.

Furthermore, some portions of the plate-shaped conductive agent may be amorphized. Specifically, the plate-shaped conductive agent may have a ratio ($I_D/I_G$) of the maximum peak intensity of D band at a frequency of 1,340 nm to 1,360 nm to the maximum peak intensity of G band at a frequency of 1,575 nm to 1,600 nm, which is obtained by Raman spectroscopy using a laser with a wavelength of 514.5 nm, of 0.5 to 1.0, for example, 0.6 to 1.0.

The G band at a frequency of 1,575 nm to 1,600 nm obtained by Raman spectroscopy is a band that appears due to vibration in a tangential direction of the plate-shaped conductive agent, and often indicates $sp^2$ bonds. The D band at a frequency of 1,340 nm to 1,360 nm obtained by Raman spectroscopy indicates $sp^3$ bonds, and it is known that the intensity thereof increases when atomic bonds composed of $sp^2$ bonds are disconnected to become $sp^3$ bonds. Since the D band in a Raman spectrum obtained for the plate-shaped conductive agent is increased when a disorder or defect is generated in the plate-shaped conductive agent, a degree of generation of the disorder or defect may be quantitatively evaluated by calculating the ratio ($I_D/I_G$) of the maximum peak intensity of the D band to the maximum peak intensity of the G band.

Specifically, in consideration of the excellent improvement effect due to the simultaneous control of the particle size distribution, specific surface area, and amorphization degree of the plate-shaped conductive agent, the plate-shaped conductive agent may include a plurality of pores, may have a particle size distribution in which $D_{50}$ is in a range of 3 μm to 4 μm and $D_{90}$ is in a range of 10 μm to 13 μm, may have a specific surface area of 200 $m^2/g$ to 260 $m^2/g$, and may have a ratio ($I_D/I_G$) of the maximum peak intensity of the D band at a frequency of 1,340 nm to 1,360 nm to the maximum peak intensity of the G band at a frequency of 1,575 nm to 1,600 nm, which is obtained by Raman spectroscopy using a laser with a wavelength of 514.5 nm, of 0.6 to 1.0.

The plate-shaped conductive agent may be used without particular limitation as long as it satisfies a morphological condition while having conductivity, but the plate-shaped conductive agent may be a graphite-based material in consideration of the formation of the conductive network in the positive electrode material mixture due to the use of the plate-shaped conductive agent and the resulting excellent electrical conductivity improvement effect, and may specifically include any one selected from the group consisting of natural graphite and artificial graphite or a mixture of two or more thereof.

In the positive electrode material mixture according to the embodiment of the present invention, it may be desirable to control the amount of the conductive agent having a characteristic shape together for the significant improvement effect due to the use of the above-described conductive agent. Specifically, the conductive agent may include 30 parts by weight to 500 parts by weight of the fibrous conductive agent and 15 parts by weight to 50 parts by weight of the plate-shaped conductive agent based on 100 parts by weight of the particulate conductive agent. When each of the conductive agents is included in the above-described amount ratio, the three-phase interface between the positive electrode active material and the electrolyte may be easily formed, the formation of a conductive path between the positive electrode active material particles may be easy, and the pore characteristics of the positive electrode material mixture may be simultaneously improved by uniform dispersion in the positive electrode material mixture. Specifically, the conductive agent may include 200 parts by weight to 400 parts by weight of the fibrous conductive agent and 30 parts by weight to 50 parts by weight of the plate-shaped conductive agent based on 100 parts by weight of the particulate conductive agent.

In the positive electrode material mixture according to the embodiment of the present invention, the binder includes a high molecular weight crystalline binder and a low molecular weight amorphous binder.

The binder is dispersed in the positive electrode material mixture to improve adherence between the positive electrode active material particles and adhesion of the positive electrode active material with a current collector and simultaneously assists the dispersion of the conductive agent, and electrolyte holding ability of the binder improves battery characteristics. Such characteristics of the binder may vary depending on crystallinity as well as molecular weight of the binder. Specifically, since a high molecular weight binder has low dispersibility, but has excellent adhesion and swelling property, it is more advantageous to hold the electrolyte component, and, as a result, the high molecular weight binder present and adhered to the positive electrode active material may further promote the formation of the three-phase interface of the positive electrode, conductive agent, and electrolyte. Also, the higher the crystallinity of the binder is, the better the mechanical properties may be obtained. Thus, in the present invention, since the high molecular weight binder is allowed to have crystallinity, adhesion around the positive electrode active material is increased and more stable adhesion between the positive electrode active material particles may be simultaneously provided to prevent mechanical exfoliation and crack generation in the positive electrode material mixture, and, as a result, life characteristics of the battery may be improved.

Furthermore, the electrolyte holding ability is improved by controlling a degree of crystallinity in the high molecular weight binder, and, as a result, the formation of the three-phase interface between the positive electrode active material and the electrolyte may be further promoted.

In a case in which non-uniform dispersion of the binder in the positive electrode material mixture occurs, non-uniformity in adhesive strength of the positive electrode material mixture to the positive electrode collector may occur and, as a result, a positive active material layer may be separated from the positive electrode collector and exfoliated. In this case, battery performance itself is not only significantly degraded, but it also causes to reduce the life characteristics of the battery. Since the above-described high molecular weight crystalline binder has low dispersibility, there is a concern about the non-uniform dispersion in the positive electrode material mixture. Thus, in the present invention, since a low molecular weight binder having low adhesion but excellent dispersibility is used together, the adhesion between the positive electrode active material particles and the adhesion between the positive electrode active material and the current collector are made to be uniform in the entire positive electrode material mixture. Furthermore, since the low molecular weight binder is amorphous, effects of increasing electrolyte sorption and reducing interfacial resistance may be increased.

Specifically, the binder includes a high molecular weight crystalline binder having a weight-average molecular weight (Mw) of 500,000 g/mol to 900,000 g/mol; and a low molecular weight amorphous binder having a weight-average molecular weight (Mw) of 200,000 g/mol to 400,000 g/mol. Mw ranges of the high molecular weight crystalline binder and the low molecular weight amorphous binder are optimized in consideration of the effect of improving the adhesion to the positive electrode active material, the conductive agent, or the positive electrode collector due to the uniform dispersion in the positive electrode material mixture as well as the adhesion of the binder itself, furthermore, the electrolyte holding ability of the binder, and the effect of promoting the formation of the three-phase interface of the positive electrode active material, the conductive agent, and the electrolyte, wherein, in a case in which the crystalline binder and the amorphous binder do not satisfy the above-described Mw ranges, there is a concern that the adhesion may be reduced and the three-phase interface formation effect may be reduced. For example, the binder includes a high molecular weight crystalline binder having a weight-average molecular weight of 580,000 g/mol to 700,000 g/mol; and a low molecular weight amorphous binder having a weight-average molecular weight of 200,000 g/mol to 300,000 g/mol. In the present invention, the weight-average molecular weight (Mw) is a polystyrene-equivalent molecular weight measured by gel permeation chromatography (GPC).

In the binder, the crystalline binder may have a degree of crystallinity of 35% to 50%. When the degree of crystallinity of the crystalline binder is less than 35%, an improvement effect due to the control of the crystallinity of the binder is insignificant, and, when the degree of crystallinity of the crystalline binder is greater than 50%, the electrode may be brittle and there is a concern that battery characteristics may be reduced due to a decrease in the electrolyte sorption and an increase in the interfacial resistance. Specifically, the crystalline binder may have a degree of crystallinity of 40% to 50%. In the present invention, the degree of crystallinity of the crystalline binder is a weight fraction of a crystalline portion relative to a total weight of the binder, wherein it may be measured by differential scanning calorimetry (DSC), nuclear magnetic resonance (NMR), or X-ray diffraction (XRD).

Also, the crystalline binder may include an H—H inverse unit in a molecule in an amount of 5 mol % to 12 mol %. The crystalline binder may include an ethylenic double bond in the molecule, and a hydrogen atom or a polar group, particularly, a fluoro group may be bonded to carbon (C) adjacent to carbon constituting the ethylenic double bond. In this case, a case, in which the fluoro group is bonded to the adjacent carbon, is referred to as the H—H inverse unit. The H—H inverse unit represents the adhesion of the binder, and suppresses side reactions to electrolyte and electrochemical reactions. However, when an amount of the H—H inverse unit is less than 5 mol %, an effect due to the control of the amount of the H—H inverse unit in the crystalline binder is insignificant, and, when the amount of the H—H inverse unit is greater than 12 mol %, since the adhesion is reduced due to a decrease in the degree of crystallinity and a thickness of the battery is increased due to electrode swelling, the battery characteristics may be reduced. Specifically, the amount of the H—H inverse unit may be in a range of 8 mol % to 12 mol %. In the present invention, the amount of the H—H inverse unit in the crystalline binder may be measured by 19F NMR.

Specifically, the crystalline binder may include a fluorine-based binder. For example, the crystalline binder may include polyvinylidene fluoride, polyhexafluoropropylene, polytetrafluoroethylene, or a copolymer of polyhexafluoropropylene-polyvinylidene fluoride, and any one thereof and a mixture of two or more thereof may be used.

Also, the fluorine-based binder may include a functional group, such as a carboxyl group, a hydroxyl group, a sulfonic acid group, and a glycidyl group, specifically, a functional group capable of hydrogen bonding with a hydroxyl group on the surface of the positive electrode active material in a molecule. The functional groups included in the binder may improve adhesiveness by forming hydrogen bonds with the hydroxyl groups present on the surface of the current collector or the surface of the positive electrode active material, may simultaneously form a lithium-ion selective permeable film on the surface of the positive electrode active material, and may suppress the formation of a lithium compound which is synthesized by a reaction between the electrolyte solution and lithium ions on the surface of the positive electrode active material during first discharge. Accordingly, since the amount of the thermally unstable lithium compound may be small even if the temperature in the battery is increased due to a short circuit, exothermic decomposition may be suppressed and the direct reaction between the electrolyte solution and the lithium ions in the active material may be suppressed at the same time. The binder may include at least one functional group, specifically, one to three functional groups in the molecule.

Furthermore, the crystalline binder may have an average particle diameter ($D_{50}$) of 50 μm to 200 μm, for example, 70 μm to 150 μm. When the crystalline binder satisfies the above-described particle diameter condition, better adhesion may be obtained. In the present invention, the average particle diameter ($D_{50}$) of the binder may be defined as a particle diameter at 50% in a cumulative particle diameter distribution, and may be measured by using a laser diffraction method as described above.

Also, the amorphous binder may include a rubber-based binder. Specifically, the amorphous binder may include a styrene-butadiene rubber, a nitrile-butadiene rubber, an acrylonitrile-butadiene rubber, or an acrylonitrile-butadiene-styrene rubber, and any one thereof and a mixture of two or more thereof may be used. Among these materials, in consideration of the significant improvement effect according to the present invention when the amorphous binder is mixed and used with the fluorine-based crystalline binder, the amorphous binder may be a nitrile-butadiene rubber.

The amorphous binder may be used in a solution phase in which the amorphous binder is dissolved in a solvent such as N-methylpyrrolidone (NMP).

In the positive electrode material mixture according to the embodiment of the present invention, it may be desirable to control a mixing ratio of the binders having the above-described molecular weights and crystallinities together in consideration of the physical properties and amount of the above-described conductive agent for the significant improvement effect due to the use of the above-described binder. Specifically, the binder may include the crystalline binder and the amorphous binder in a mixing weight ratio of 1:1 to 12:1, particularly 5:1 to 12:1, and more particularly 9:1 to 12:1.

A binder typically included in a positive electrode material mixture has low miscibility with a conductive agent, and an amorphous rubber-based binder having hydrophilicity among various binders has low miscibility with a crystalline binder having hydrophobicity as well as the conductive agent. With respect to the amorphous rubber-based binder, it is adsorbed on the surface of the conductive agent to be dispersed in a slurry for the positive electrode material mixture, and the amorphous rubber-based binder not adsorbed on the surface of the conductive agent causes a phase separation in the positive electrode material mixture. Also, in a case in which heterogeneous conductive agents having shape anisotropy are mixed and used, the amorphous rubber-based binder exhibits a higher surface adsorption tendency for the conductive agent having a higher specific surface area among the conductive agents. Among the particulate, plate-shaped, and fibrous conductive agents used in the present invention, the plate-shaped conductive agent normally has a higher specific surface area, but the plate-shaped conductive agent itself has excellent dispersibility. In contrast, the particulate conductive agent has a high specific surface area next to the plate-shaped conductive agent and exhibits significantly low dispersibility in comparison to the plate-shaped conductive agent. Accordingly, in the case that the heterogeneous conductive agents having shape anisotropy are mixed and used, the conductive agent having low dispersibility is predispersed with the binder, wherein, in the present invention, the particulate conductive agent is predispersed with the amorphous binder. Thus, dispersibility of the amorphous binder in the positive electrode material mixture and dispersion stability of a predispersion solution of the conductive agent and the binder may be further improved by controlling the amounts of the particulate conductive agent and the amorphous binder together.

Accordingly, the positive electrode material mixture according to the embodiment of the present invention may further improve the dispersibility of the conductive agent and the binder in the positive electrode material mixture by including the above-described amorphous binder in an amount such that SOP, a percentage of the amount of the amorphous binder to the amount of the particulate conductive agent which is calculated according to Equation 1 below, is 20% or less, in addition to the mixing ratio of the crystalline binder and the amorphous binder:

SOP(%)=(weight of amorphous binder/weight of particulate conductive agent)*100   [Equation 1]

In a case in which the amorphous binder is included in an amount satisfying the above-described SOP condition, since the amorphous binder in the positive electrode material mixture is adsorbed on the surface of the particulate conductive agent and dispersed, uniform dispersion of the conductive agent is possible without worrying about the phase separation. In consideration of the significant improvement effect due to the control of the SOP condition, the positive electrode material mixture may include the amorphous binder in an amount such that the SOP is in a range of 10% to 20%.

In the positive electrode material mixture according to the embodiment of the present invention, in consideration of a more significant improvement effect due to the use of the above-described binder, the conductive agent included in the positive electrode material mixture may include 30 parts by weight to 500 parts by weight of the fibrous conductive agent and 15 parts by weight to 50 parts by weight of the plate-shaped conductive agent based on 100 parts by weight of the particulate conductive agent, the binder may include the crystalline binder having a weight-average molecular weight of 500,000 g/mol to 900,000 g/mol; and the amorphous binder having a weight-average molecular weight of 200,000 g/mol to 400,000 g/mol in a mixing weight ratio of 1:1 to 12:1, and the positive electrode material mixture may include the amorphous binder in an amount such that the SOP calculated according to Equation 1 is 20% or less, for example, 10% to 20%. Specifically, in the above-described positive electrode material mixture, the particulate conductive agent may have an average particle diameter ($D_{50}$) of 10 nm to 45 nm and a specific surface area of 40 $m^2/g$ to 170 $m^2/g$, and the plate-shaped conductive agent may include a plurality of pores, may have a specific surface area of 200 $m^2/g$ to 260 $m^2/g$, and may have a ratio ($I_D/I_G$) of the maximum peak intensity of the D band at a frequency of 1,340 nm to 1,360 nm to the maximum peak intensity of the G band at a frequency of 1,575 nm to 1,600 nm, which is obtained by Raman spectroscopy using a laser with a wavelength of 514.5 nm, of 0.5 to 1.0.

In the positive electrode material mixture according to the embodiment of the present invention, the positive electrode active material, as a compound (lithiated intercalation compound) capable of reversibly intercalating and deintercalating lithium, may specifically be a lithium composite metal oxide including lithium and a metal such as cobalt, manganese, nickel, or aluminum.

Specifically, the positive electrode active material may include a compound of the following Formula 1:

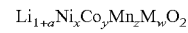   [Formula 1]

in Formula 1, M may be at least one selected from the group consisting of aluminum (Al), copper (Cu), iron (Fe), vanadium (V), chromium (Cr), titanium (Ti), zirconium (Zr), zinc (Zn), tantalum (Ta), niobium (Nb), magnesium (Mg), boron (B), tungsten (W), and molybdenum (Mo), and a, x, y, z, and w represent an atomic fraction of each independent element, wherein $-0.5 \leq a \leq 0.5$, $0 \leq x \leq 1$, $0 \leq y \leq 1$, $0 \leq z \leq 1$, $0 \leq w \leq 1$, and $0 < x+y+z \leq 1$.

In consideration of the significant improvement effect due to the mixed use of the conductive agent and the binder, the positive electrode active material may include a nickel excess lithium composite metal oxide in which $-0.5 \leq a \leq 0.5$, $0 < x < 1$, $0 < y < 1$, $0 < z < 1$, $0 \leq w \leq 1$, and $y+z \leq x$ in Formula 1.

Specifically, in terms of increasing capacity characteristics and stability of the battery, the positive electrode active material may include $LiNi_{0.6}Mn_{0.2}Co_{0.2}O_2$, $LiNi_{0.5}Mn_{0.3}Co_{0.2}O_2$, $LiNi_{0.7}Mn_{0.15}Co_{0.15}O_2$, or LiNi$_{0.8}$Mn$_{0.1}$Co$_{0.1}$O$_2$, and any one thereof or a mixture of two or more thereof may be used.

Also, the positive electrode active material may have an average particle diameter (D$_{50}$) of 3 μm to 20 μm in consideration of specific surface area and positive electrode material mixture density. In a case in which the average particle diameter of the positive electrode active material is less than 3 μm, dispersibility in the positive electrode material mixture may be reduced due to the agglomeration of the positive electrode active material, and, in a case in which the average particle diameter is greater than 20 μm, mechanical strength and specific surface area of the positive electrode active material may be reduced. In consideration of a significant effect of improvement in rate capability and initial capacity characteristics due to its specific structure, the positive electrode active material may have an average particle diameter (D$_{50}$) of 3 μm to 15 μm. In the present invention, the average particle diameter (D$_{50}$) of the positive electrode active material may be defined as a particle diameter at 50% in a cumulative particle diameter distribution. In the present invention, the average particle diameter (D$_{50}$) of the positive electrode active material, for example, may be measured by using a laser diffraction method. For example, in the method of measuring the average particle diameter (D$_{50}$) of the positive electrode active material, particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about kHz and an output of 60 W, and the average particle diameter (D$_{50}$) at 50% in a cumulative particle diameter distribution of the measurement instrument may then be calculated.

The positive electrode material mixture according to the embodiment of the present invention including the above-described conductive agent, binder, and positive electrode active material may include 0.5 wt % to 10 wt % of the conductive agent, 0.5 wt % to 10 wt % of the binder, and 80 wt % to 99 wt % of the positive electrode active material based on a total weight of the positive electrode material mixture. In a case in which the amounts of the conductive agent, binder, and positive electrode active material are outside the above-described ranges, there is a concern that the improvement effect according to the present invention may be insignificant, or the battery characteristics may be reduced. For example, since the positive electrode active material and the conductive agent do not have adhesiveness, adhesion between the positive electrode active material and the conductive agent and adhesion between a positive electrode active material layer and the current collector may be increased by increasing the amount of the binder. However, since a ratio of the positive electrode active material is relatively decreased when the amounts of the conductive agent and the binder in the positive electrode material mixture are increased, capacity is reduced. Also, in a case in which the binder is present in an excessively large amount more than required to connect the positive electrode active material and the conductive agent or increase the adhesion to the current collector, resistance in the positive electrode is increased. In contrast, in a case in which the amount of the binder is excessively low, the adhesion to the current collector is reduced to increase the interfacial resistance between the current collector and the positive electrode active material, and a contact between the positive electrode active material and the conductive agent is reduced to increase the resistance in the positive electrode material mixture. Furthermore, an excessive amount of the binder may enter into pores between the positive electrode active material particles to increase resistance in which lithium ions diffuse into the pores. Specifically, in consideration of a significant improvement effect due to the control of the amounts of the above-described components, the positive electrode material mixture may include 2 wt % to 10 wt % of the conductive agent, 1 wt % to 5 wt % of the binder, and 89 wt % to 93 wt % of the positive electrode active material based on the total weight of the positive electrode material mixture.

Also, the positive electrode material mixture may have a porosity of 20 vol % to 35 vol %, for example, 23 vol % to 30 vol % by including the above-described components within the above ranges. In the present invention, the porosity of the positive electrode material mixture may be determined from an amount of mercury intruded into pores which is measured by mercury porosimetry analysis, or may be measured based on the amounts of nitrogen, which are adsorbed and desorbed according to partial pressure (0.11<p/p$_o$<1), using a Micromeritics ASAP 2010 analyzer.

The positive electrode material mixture as described above may be prepared by mixing the conductive agent, the binder, and the positive electrode active material. Thus, according to another embodiment of the present invention, a method of preparing the positive electrode material mixture is provided.

Specifically, the positive electrode material mixture may be prepared by mixing a conductive agent, a binder, and a positive electrode active material in a solvent, more specifically may be prepared by predispersing the conductive agent and the binder in the solvent and then adding and mixing the positive electrode active material in order to increase dispersibility of the components of the finally prepared positive electrode material mixture, and, for example, may be prepared by predispersing a particulate conductive agent and an amorphous binder, then adding and mixing plate-shaped and fibrous conductive agents and a crystalline binder, and subsequently adding and mixing the positive electrode active material. In this case, types and amounts of the conductive agent, the binder, and the positive electrode active material are the same as described above, and the positive electrode material mixture according to the embodiment of the present invention may further include a solvent.

As the solvent, any solvent may be used without particular limitation as long as it is typically used in a composition for forming a positive electrode. Specific examples of the solvent may be an aliphatic hydrocarbon-based solvent such as pentane, n-hexane, octane, cyclopentane, or cyclohexane; an aromatic hydrocarbon-based solvent such as benzene, toluene, or xylene; an aldehyde-based solvent such as furfural; a ketone-based solvent such as acetone, methylethylketone, cyclopentanone, or cyclohexanone; an ester-based solvent such as butyl acetate, ethyl acetate, methyl acetate, butyl propionate, ethylene glycol monoethyl ether acetate, propylene glycol monomethyl ether acetate, 3-methoxybutyl acetate, or ethylene glycol diacetate; an ether-based solvent such as tetrahydrofuran or dioxane; an alcohol-based solvent such as methanol, ethanol, n-propyl alcohol, isopropyl alcohol, butyl alcohol, octyl alcohol, cyclohexanol, aryl alcohol, benzyl alcohol, cresol, or furfuryl alcohol; a polyol-based solvent such as glycerol, ethylene glycol, or diethylene glycol; an alcohol ether-based solvent such as ethylene glycol monomethyl ether, ethylene glycol monoethyl ether, ethylene glycol monobutyl ether, propylene glycol monomethyl ether, ethylene glycol dimethyl ether, or diethylene glycol monobutyl ether; an aprotic polar solvent such as N-methyl-2-pyrrolidone, dimethyl sulfoxide, or dimethylformamide; or water, and one alone or a mixture of two or more thereof may be used.

Since the positive electrode material mixture according to the embodiment of the present invention includes three or more types of the conductive agents having different shapes, these conductive agents may be uniformly dispersed in the positive electrode active material, and thus, a solid content may be further increased in comparison to a conventional positive electrode material mixture. Specifically, the solid content including the positive electrode active material, the conductive agent, and the binder may be in a range of 60 wt % to 70 wt % based on the total weight of the positive electrode material mixture. In a case in which the positive electrode material mixture has the above-described solid content, the positive electrode material mixture may have viscosity (specifically, viscosity of 3,000 cps to 30,000 cps in a room temperature (18±5° C.) environment) at which the positive electrode collector may be easily coated during a subsequent coating process for the positive electrode collector. In a case in which the solid content is greater than 70 wt %, since the viscosity is excessively increased, problems may arise in terms of securing ease of transport and fluidity during the coating process for the positive electrode collector, and, in a case in which the solid content is less than 60 wt %, since the viscosity of the prepared positive electrode material mixture is excessively low, coating on the positive electrode collector may not be easy and it may be difficult to form a positive electrode material mixture layer having a uniform thickness. Accordingly, in consideration of coatability and processability during the preparation of the positive electrode material mixture layer, the solvent may be included in an amount to have an appropriate viscosity, for example, a viscosity of 3,000 cps to 30,000 cps. In the present invention, the viscosity is defined as a value measured using a BM-type viscometer (product of TOKIMEC INC.) at 25° C.

Also, during the preparation of the positive electrode material mixture layer according to the above method, a dispersant may be further used to improve dispersion efficiency of the conductive agent.

Any dispersant may be used without particular limitation as long as it is typically used in the composition for forming a positive electrode. Specific examples of the dispersant may be a cellulose-based compound, polyalkylene oxide, polyvinyl alcohol, polyvinylpyrrolidone, polyvinyl acetal, polyvinyl ether, polyvinyl sulfonic acid, polyvinyl chloride (PVC), polyvinylidene fluoride, chitosans, starch, amylose, polyacrylamide, poly-N-isopropylacrylamide, poly-N—N-dimethylacrylamide, polyethyleneimine, polyoxyethylene, poly(2-methoxyethoxyethylene), poly(acrylamide-co-diaryldimethylammonium chloride), an acrylonitrile/butadiene/styrene (ABS) polymer, an acrylonitrile/styrene/acryl ester (ASA) polymer, a mixture of an acrylonitrile/styrene/acryl ester (ASA) polymer and propylene carbonate, a styrene/acrylonitrile (SAN) copolymer, or a methyl methacrylate/acrylonitrile/butadiene/styrene (MABS) polymer, and one alone or a mixture of two or more thereof may be used.

Specifically, the dispersant may include a cellulose-based compound, and, in this case, a weight-average molecular weight (Mw) of the cellulose-based compound may be in a range of 2,000,000 g/mol to 3,000,000 g/mol. In a case in which the Mw of the cellulose-based compound is less than 2,000,000 g/mol, a dispersibility improvement effect may be insignificant, and, in a case in which the Mw of the cellulose-based compound is greater than 3,000,000 g/mol, difficulties in processing may occur during the preparation of the positive electrode material mixture and the capacity may decrease. In the present invention, the weight-average molecular weight (Mw) of the cellulose-based compound is a polystyrene-equivalent weight-average molecular weight (Mw) measured by gel permeation chromatography (GPC). For example, the dispersant may be carboxymethyl cellulose which satisfies the above-described weight-average molecular weight condition.

Furthermore, the dispersant may be used in an amount of 0.1 part by weight to 10 parts by weight based on 100 parts by weight of the positive electrode active material. In a case in which the amount of the dispersant is less than 0.1 part by weight, the improvement effect due to the use of the dispersant may be insignificant, and, in a case in which the amount of the dispersant is greater than 10 parts by weight, since the amounts of the conductive agent and the positive electrode active material may be relatively reduced due to the use of the excessive amount of the dispersant, the battery characteristics may be reduced.

Also, a method of mixing the above-described conductive agent, binder, positive electrode active material, and dispersant or dispersing them in the solvent may be performed according to a typical mixing or dispersion method.

Specifically, the method may be performed by using a mixing or dispersing apparatus such as a homogenizer, bead mill, ball mill, basket mill, attrition mill, universal stirrer, clear mixer, or TK mixer. For example, the dispersion may be performed by jet stream. In a case in which a dispersion process is performed by using the jet stream, uniform dispersion of the above-described components in the solvent may be promoted.

Specifically, the dispersion may be performed by performing primary dispersion at a rotational speed of 1,000 rpm to 5,000 rpm for 30 minutes to 1 hour and then performing secondary dispersion at a rotational speed of 10,000 rpm to 25,000 rpm for 10 minutes to 20 minutes by the jet stream.

Furthermore, the method of preparing the positive electrode material mixture according to the embodiment of the present invention may further include a milling process for the conductive agent, particularly, the fibrous conductive agent, before the mixing of the components.

With respect to the fibrous conductive agent used in the preparation of the positive electrode material mixture, particularly, carbon nanotubes, a unit constituting the carbon nanotubes has an entangled form, its shape is similar to a cocoon, and an average particle diameter ($D_{50}$) of the cocoon-shaped carbon nanotubes reaches about 200 μm or more. In a case in which the positive electrode material mixture is prepared by directly using the carbon nanotubes, since a filter clogging phenomenon may occur during the mixing process and some of the agglomerated carbon nanotubes are exposed to the surface of the electrode due to non-uniform dispersion of the carbon nanotubes in the solvent, the conductivity may be reduced. Accordingly, the dispersibility of the conductive agent in the positive electrode material mixture may be further increased by milling the fibrous conductive agent before the mixing with the materials constituting the positive electrode material mixture. The milling method is not particularly limited, but the milling may be performed by using a conventional milling method such as ball milling.

According to another embodiment of the present invention, a positive electrode for a secondary battery including the positive electrode material mixture is provided.

Specifically, the positive electrode for a secondary battery includes a positive electrode collector; and the above-described positive electrode material mixture layer as a positive electrode active material layer disposed on the positive electrode collector.

In the positive electrode, any positive electrode collector may be used without particular limitation as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may have a thickness of 3 µm to 500 µm and may have a microscopic uneven surface to improve the adhesion of the positive electrode active material. The positive electrode collector, for example, may be used in various shapes such as that of a film, a sheet, a foil, a net, a porous body, a foam body, a non-woven fabric body, and the like.

The positive electrode may be prepared according to a typical method of preparing a positive electrode except that the above-described positive electrode material mixture is used as a composition for forming the positive electrode active material layer.

Specifically, the positive electrode may be prepared by coating the positive electrode material mixture on the positive electrode collector, and then drying and rolling the coated positive electrode collector. In this case, coating, drying, and rolling processes of the positive electrode material mixture for the positive electrode collector may be performed by a typical method.

Specifically, the coating process of the positive electrode material mixture may be performed by coating one surface of the positive electrode collector using a typical slurry coating method such as bar coating, spin coating, roll coating, slot die coating, or spray coating. The coating may be performed by a single method or may be performed in combination of two or more methods. Also, when coating with the positive electrode material mixture, the positive electrode material mixture may be coated to an appropriate thickness in consideration of the amount and thickness of the active material loaded in the finally prepared positive electrode active material layer.

Thereafter, the drying and rolling processes may be selectively performed on the coating layer of the positive electrode material mixture which is formed on the positive electrode collector.

The drying process may be performed by a method such as a heat treatment or hot-air injection at a temperature in which moisture included in the positive electrode material mixture is removed as much as possible along with the evaporation of the solvent in the positive electrode material mixture and a binding force of the binder may be increased at the same time. Specifically, the drying process may be performed at a temperature above a boiling point of the solvent and below a melting point of the binder, for example, at a temperature of 100° C. to 150° C. The drying process, for example, may be performed at a temperature of 100° C. to 120° C. and a pressure of 10 torr or less for 1 hour to 50 hours.

Also, as another method, the positive electrode may be prepared by casting the above-described positive electrode material mixture on a separate support and then laminating a film of the positive electrode material mixture, which is obtained by being peeled off from the support, on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode, which selectively includes the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x$ (0<x<2), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEV).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

(1) Preparation of Positive Electrode Material Mixture 94.5 wt % of $LiNi_{0.7}Co_{0.15}Mn_{0.15}O_2$ (average particle diameter ($D_{50}$)=10 μm) as a positive electrode active material, about 2 wt % of acetylene black having an average particle diameter ($D_{50}$) of about 38 nm and a specific surface area of about 58 $m^2/g$ as a particulate conductive agent, about 1 wt % of carbon nanotubes having a diameter of about 150 nm, a length of about 6 μm, and a specific surface area of about 13 $m^2/g$ as a fibrous conductive agent, about 0.5 wt % of porous natural graphite having an average particle diameter ($D_{50}$) of about 3.2 μm, a $D_{90}$ of about 11 μm, a degree of amorphization ($I_D/I_G$) of about 6.6, and a specific surface area of about 235 $m^2/g$ as a plate-shaped conductive agent, 1.8 wt % of polyvinylidene fluoride (PVdF) having a weight-average molecular weight of about 630,000 g/mol, a degree of crystallinity of 42%, and an H—H inverse unit of 8 mol % as a crystalline binder, and 0.2 wt % of a nitrile butadiene rubber having a weight-average molecular weight of about 300,000 g/mol as an amorphous binder were added to a N-methyl-2-pyrrolidone (NMP) solvent based on a total weight of a positive electrode material mixture including the positive electrode active material, conductive agent, and binder except the solvent and mixed to prepare the positive electrode material mixture (viscosity: 8,000 cps, solid content: 74 wt %, solvent content: 26 wt %). During the mixing, predispersion was performed by first mixing the particulate conductive agent and the amorphous binder in the solvent, the crystalline binder as well as the plate-shaped and fibrous conductive agents was then added and mixed, and the positive electrode active material was added and mixed with the predispersion solution thus obtained.

(2) Preparation of Lithium Secondary Battery

An about 20 μm thick aluminum (Al) thin film, as a positive electrode collector, was coated with the positive electrode material mixture prepared in (1) and dried, and the coated Al thin film was then roll-pressed to prepare a positive electrode.

A negative electrode slurry was prepared by adding 96 wt % of carbon powder as a negative electrode active material, 3 wt % of PVdF as a binder, and 1 wt % of carbon black as a conductive agent to NMP as a solvent. A 10 μm thick copper (Cu) thin film, as a negative electrode collector, was coated with the negative electrode slurry and dried, and the coated Cu thin film was then roll-pressed to prepare a negative electrode.

After facing the positive electrode and negative electrode thus prepared, an electrode assembly was prepared by disposing a separator formed of three layers of polypropylene/polyethylene/polypropylene (PP/PE/PP) between the positive electrode and the negative electrode. After the electrode assembly was accommodated in a battery case, and a lithium secondary battery was prepared by injecting a non-aqueous electrolyte solution in which a non-aqueous solvent having a composition of ethylene carbonate (EC):ethylmethyl carbonate (EMC):dimethyl carbonate (DMC) of 3:3:4 (volume ratio) and 1 mol/l of $LiPF_6$, as a lithium salt, based on a total amount of the non-aqueous electrolyte solution were added.

Examples 2 to 7 and Comparative Examples 1 to 3

Lithium secondary batteries were prepared in the same manner as in Example 1 except that positive electrode material mixtures were prepared with compositions listed in Table 1 below.

TABLE 1

| | | Comparative Example 1 | Comparative Example 2 | Comparative Example 3 | Example 1 |
|---|---|---|---|---|---|
| Positive electrode active material | | $LiNi_{0.7}Co_{0.15}Mn_{0.15}O_2$[1] (95) | $LiNi_{0.7}Co_{0.15}Mn_{0.15}O_2$[1] (95.5) | $LiNi_{0.7}Co_{0.15}Mn_{0.15}O_2$[1] (95.5) | $LiNi_{0.7}Co_{0.15}Mn_{0.15}O_2$[1] (94.5) |
| Conductive agent | Particulate conductive agent | Acetylene black [2] (3) | Acetylene black [2] (1) | Acetylene black [2] (1) | Acetylene black [2] (2) |
| | Fibrous conductive agent | — | Carbon nanotubes [3] (1) | Carbon nanotubes [3] (1) | Carbon nanotubes [3] (1) |
| | Plate-shaped conductive agent | — | Graphite [5] (0.5) | Graphite [5] (0.5) | Graphite [5] (0.5) |
| Binder | Crystalline binder | PVdF[6] (1.8) | PVdF[7] (2) | — | PVdF[6] (1.8) |
| | Amorphous binder | NBR[8] (0.2) | — | NBR[9] (2) | NBR[8] (0.2) |

| | | Example 2 | Example 3 | Example 4 |
|---|---|---|---|---|
| Positive electrode active material | | $LiNi_{0.7}Co_{0.15}Mn_{0.15}O_2$[1] (95.5) | $LiNi_{0.7}Co_{0.15}Mn_{0.15}O_2$[1] (95.5) | $LiNi_{0.7}Co_{0.15}Mn_{0.15}O_2$[1] (95.5) |
| Conductive agent | Particulate conductive agent | Acetylene black [2] (1) | Acetylene black [2] (1) | Acetylene black [2] (1) |
| | Fibrous conductive agent | Carbon nanotubes [3] (1) | Carbon nanofibers [4] (1) | Carbon nanotubes [3] (1) |
| | Plate-shaped conductive agent | Graphite [5] (0.5) | Graphite [5] (0.5) | Graphite [5] (0.5) |
| Binder | Crystalline binder | PVdF[6] (1.8) | PVdF[6] (1.8) | PVdF[7] (1.8) |
| | Amorphous binder | NBR[8] (0.2) | NBR[8] (0.2) | NBR[9] (0.2) |

| | | Example 5 | Example 6 | Example 7 |
|---|---|---|---|---|
| Positive electrode active material | | $LiNi_{0.7}Co_{0.15}Mn_{0.15}O_2$[1] (95.5) | $LiNi_{0.7}Co_{0.15}Mn_{0.15}O_2$[1] (95.5) | $LiNi_{0.7}Co_{0.15}Mn_{0.15}O_2$[1] (95.5) |
| Conductive agent | Particulate conductive agent | Acetylene black [2] (1) | Acetylene black [2] (1) | Acetylene black [2] (1) |
| | Fibrous conductive agent | Carbon nanotubes [3] (1) | Carbon nanotubes [3] (1) | Carbon nanotubes [3] (1) |
| | Plate-shaped conductive agent | Graphite [5] (0.5) | Graphite [5] (0.5) | Graphite [5] (0.5) |
| Binder | Crystalline binder | PVdF[7] (1.6) | PVdF[7] (1.8) | PVdF[7] (1.6) |
| | Amorphous binder | NBR[9] (0.4) | NBR[10] (0.2) | NBR[10] (0.4) |

In Table 1,
1) $LiNi_{0.7}Co_{0.15}Mn_{0.15}O_2$: average particle diameter $(D_{50})=10$ μm
2) acetylene black: average particle diameter $(D_{50})$ of primary particles=about 38 nm, specific surface area=about 58 $m^2/g$
3) carbon nanotubes: diameter=about 150 nm, length=about 6 μm, specific surface area=about 13 $m^2/g$
4) carbon nanofibers: diameter=about 300 nm, length=about 25 μm, specific surface area=about 6 $m^2/g$, and prepared from combustion of polyethylene
5) graphite: porous natural graphite, $D_{50}$=about 3.2 μm, $D_{90}$=about 11 μm, degree of amorphization $(I_D/I_G)$=about 6.6, specific surface area=about 235 $m^2/g$
6) PVdF: crystalline polyvinylidene fluoride powder, weight-average molecular weight (Mw)=about 630,000 g/mol, degree of crystallinity=42%, amount of H—H inverse unit=8 mol %, particle diameter range=50 μm to 200 μm
7) PVdF: crystalline polyvinylidene fluoride powder, weight-average molecular weight (Mw)=about 880,000 g/mol, degree of crystallinity=42%, amount of H—H inverse unit=8 mol %, particle diameter range=50 μm to 200 μm
8) NBR: amorphous nitrile butadiene rubber, weight-average molecular weight (Mw)=about 300,000 g/mol
9) NBR: amorphous nitrile butadiene rubber, weight-average molecular weight (Mw)=about 200,000 g/mol
10) NBR: amorphous nitrile butadiene rubber, weight-average molecular weight (Mw)=about 400,000 g/mol.

Also, the symbols "( )" at each bottom in Table 1 indicate an amount (wt %).

Experimental Example 1: Evaluation of Dispersibility of Conductive Agent and Binder In general, a binder included in a positive electrode material mixture has low miscibility with a conductive agent, and an amorphous rubber-based binder having hydrophilicity among various binders has low miscibility with a crystalline binder having hydrophobicity as well as the conductive agent. With respect to the amorphous rubber-based binder, it is adsorbed on the surface of the conductive agent to be dispersed in a slurry for the positive electrode material mixture, and the amorphous rubber-based binder not adsorbed on the surface of the conductive agent causes a phase separation in the slurry. Also, in a case in which heterogeneous conductive agents are mixed and used, the amorphous rubber-based binder exhibits a higher surface adsorption tendency for the conductive agent having a higher specific surface area among the conductive agents.

Thus, during the preparation of the positive electrode material mixture according to the present invention, it was aimed at finding out optimum amounts which may increase miscibility between the amorphous binder and the crystalline binder and dispersibility of the binder and the conductive agent in the positive electrode material mixture.

First, the miscibility according to a mixing ratio during the mixing of the crystalline binder and the amorphous binder was evaluated.

Specifically, crystalline polyvinylidene fluoride (PVdF) (about 630,000 g/mol, degree of crystallinity=42%, amount of H—H inverse unit=8 mol %), as the crystalline binder, and an amorphous nitrile butadiene rubber (weight-average molecular weight (Mw)=about 300,000 g/mol), as the amorphous binder, were mixed at ratios listed in the following Table 2 in a NMP solvent, and the presence of phase separation was then observed. The results thereof are presented in FIG. 1.

TABLE 2

|  |  | Reference Example 1 | Reference Example 2 | Reference Example 3 |
|---|---|---|---|---|
| Binder | Crystalline binder (wt %) | PVdF (90) | PVdF (92.5) | PVdF (95) |
|  | Amorphous binder (wt %) | NBR (10) | NBR (7.5) | NBR (5) |

As illustrated in FIG. 1, when the crystalline binder and the amorphous binder were mixed, the mixed solutions became opaque due to the phase separation of the crystalline binder and the amorphous binder regardless of the mixing ratio.

Subsequently, dispersibility and phase stability of a predispersion solution and a slurry for the positive electrode material mixture according to mixing ratios of the amorphous rubber-based binder and the acetylene black were evaluated.

Specifically, after preparing predispersion solutions by dispersing conductive agent and binder at ratios listed in the following Table 3 in a NMP solvent, a positive electrode active material was added and mixed to prepare slurries for the positive electrode material mixture. In this case, the presence of phase separation in each predispersion solution of the conductive agent and the binder and each slurry for the positive electrode material mixture was observed. The results thereof are presented in FIG. 2.

TABLE 3

|  |  | Reference Example 4 | Reference Example 5 | Reference Example 6 | Reference Example 7 |
|---|---|---|---|---|---|
| Positive electrode active material (wt %) |  | $LiNi_{0.6}Co_{0.2}Mn_{0.2}O_2$[11] (95.5) | $LiNi_{0.6}Co_{0.2}Mn_{0.2}O_2$[11] (95.75) | $LiNi_{0.6}Co_{0.2}Mn_{0.2}O_2$[11] (96.0) | $LiNi_{0.6}Co_{0.2}Mn_{0.2}O_2$[11] (96.25) |
| Conductive agent (wt %) | Particulate conductive agent | Acetylene black[12] (1.5) | Acetylene black[12] (1.25) | Acetylene black[12] (1.0) | Acetylene black[12] (0.75) |
|  | Fibrous conductive agent | — | — | — | — |
|  | Plate-shaped conductive agent | Graphite[13] (0.5) | Graphite[13] (0.5) | Graphite[13] (0.5) | Graphite[13] (0.5) |
| Binder (wt %) | Crystalline binder | PVdF[14] (2.3) | PVdF[14] (2.18) | PVdF[14] (2.18) | PVdF[14] (2.18) |
|  | Amorphous binder | NBR[15] (0.2) | NBR[15] (0.32) | NBR[15] (0.32) | NBR[15] (0.32) |

TABLE 3-continued

|  | Reference Example 4 | Reference Example 5 | Reference Example 6 | Reference Example 7 |
|---|---|---|---|---|
| SOP (%) [16] | 13.3 | 25.6 | 32.0 | 42.6 |
| Mixing weight ratio of crystalline binder to amorphous binder | 92/8 | 87.2/12.8 | 87.2/12.8 | 87.2/12.8 |

In Table 3,

11) $LiNi_{0.6}Co_{0.2}Mn_{0.2}O_2$: average particle diameter $(D_{50})$= 10 μm 12) acetylene black: average particle diameter $(D_{50})$=about 23 nm, specific surface area=about 45 m²/g 13) graphite: porous graphite, $D_{50}$=about 3.2 μm, $D_{90}$=about 11 μm, degree of amorphization $(I_D/I_G)$=about 6.6, specific surface area=about 235 m²/g 14) PVdF: crystalline polyvinylidene fluoride powder, weight-average molecular weight (Mw)=about 630,000 g/mol, degree of crystallinity=42%, amount of H—H inverse unit=8 mol %, particle diameter range=50 μm to 200 μm 15) NBR: amorphous nitrile butadiene rubber, weight-average molecular weight (Mw)=about 300,000 g/mol 16) SOP: a percentage of the amount of the amorphous binder (NBR) to the particulate conductive agent (acetylene black) according to Equation 1 below $SOP(\%)$=(weight of amorphous binder/weight of particulate conductive agent)*100     [Equation 1]

Figure 2:
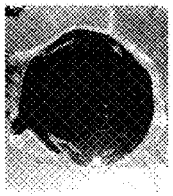
FIG. 2 is photographs showing phase stabilities of positive electrode material mixtures and predispersion solutions of conductive agent and binder during the preparation of the positive electrode material mixtures according to Reference Examples 4 to 7.

As illustrated in FIG. 2, with respect to Reference Example 4 in which the SOP was 13.3%, phase separation was not observed in both of the predispersion solution of the conductive agent and the binder and the slurry further including the positive electrode active material, but, with respect to Reference Examples 5 to 7 in which the SOP was greater than 20%, phase separation was observed in both of the predispersion solution and the slurry. From the above results, it may be understood that, when the SOP was 20% or less, since the amorphous binder was sufficiently adsorbed to the particulate conductive agent and dispersed in the slurry for the positive electrode material mixture, the conductive agent and the binder were uniformly dispersed without worrying about the phase separation.

Experimental Example 2: Evaluation of Adhesion and Resistance Characteristics of Crystalline Binder Effects of the weight-average molecular weight of the crystalline PVdF binder on adhesion and resistance in the positive electrode were evaluated.

Specifically, positive electrodes and lithium secondary batteries (monocells) were prepared in the same manner as in Example 1 except that positive electrode material mixtures were prepared with compositions listed in the following Table 4.

A 180-degree peel test was performed on each prepared positive electrode to evaluate adhesion between the positive electrode material mixture layer and the positive electrode collector.

Figure 3A:
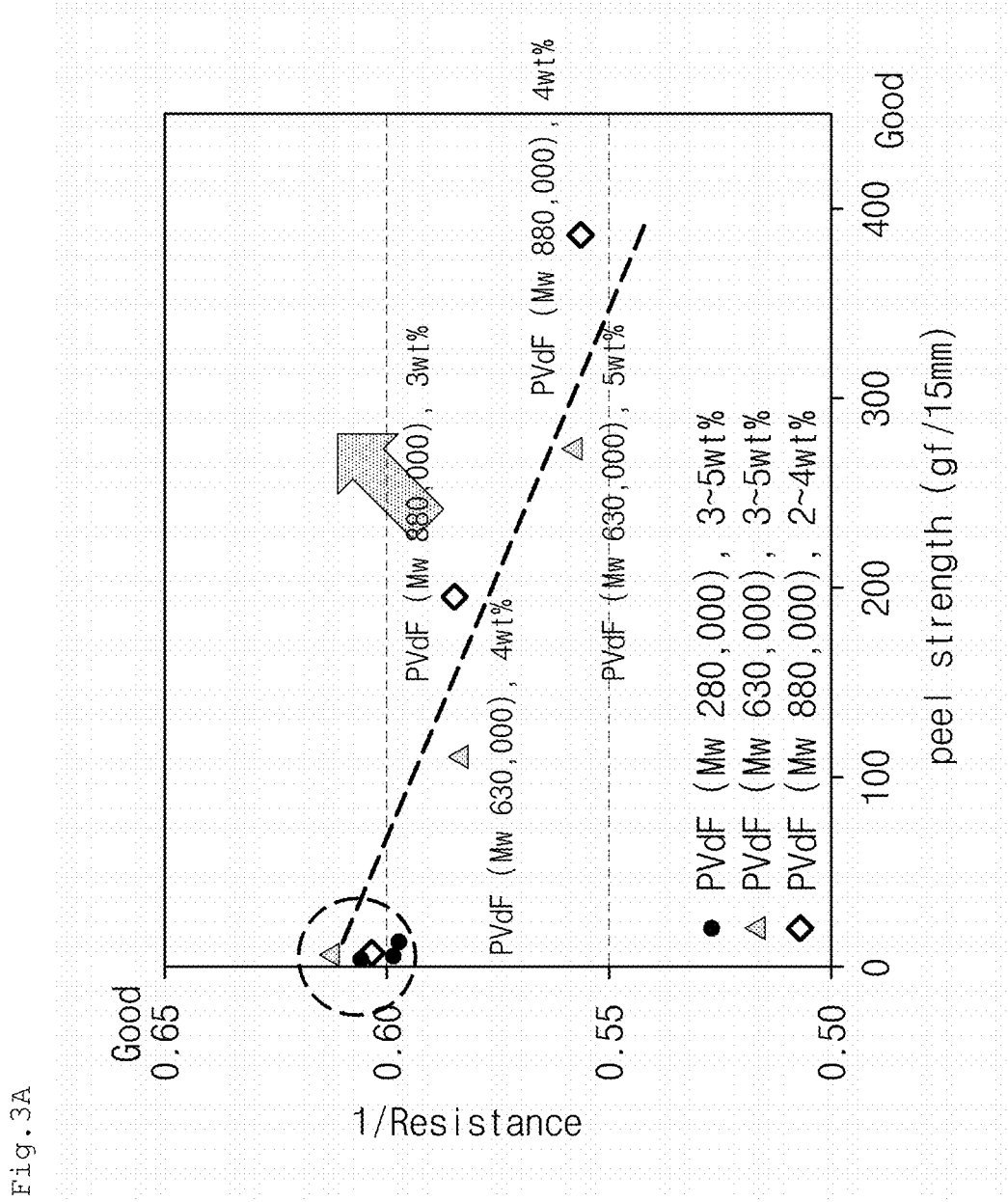
FIG. 3A is a graph illustrating changes in adhesion and resistance according to weight-average molecular weight and amount of a binder in Experimental Example 2.
Figure 3B:
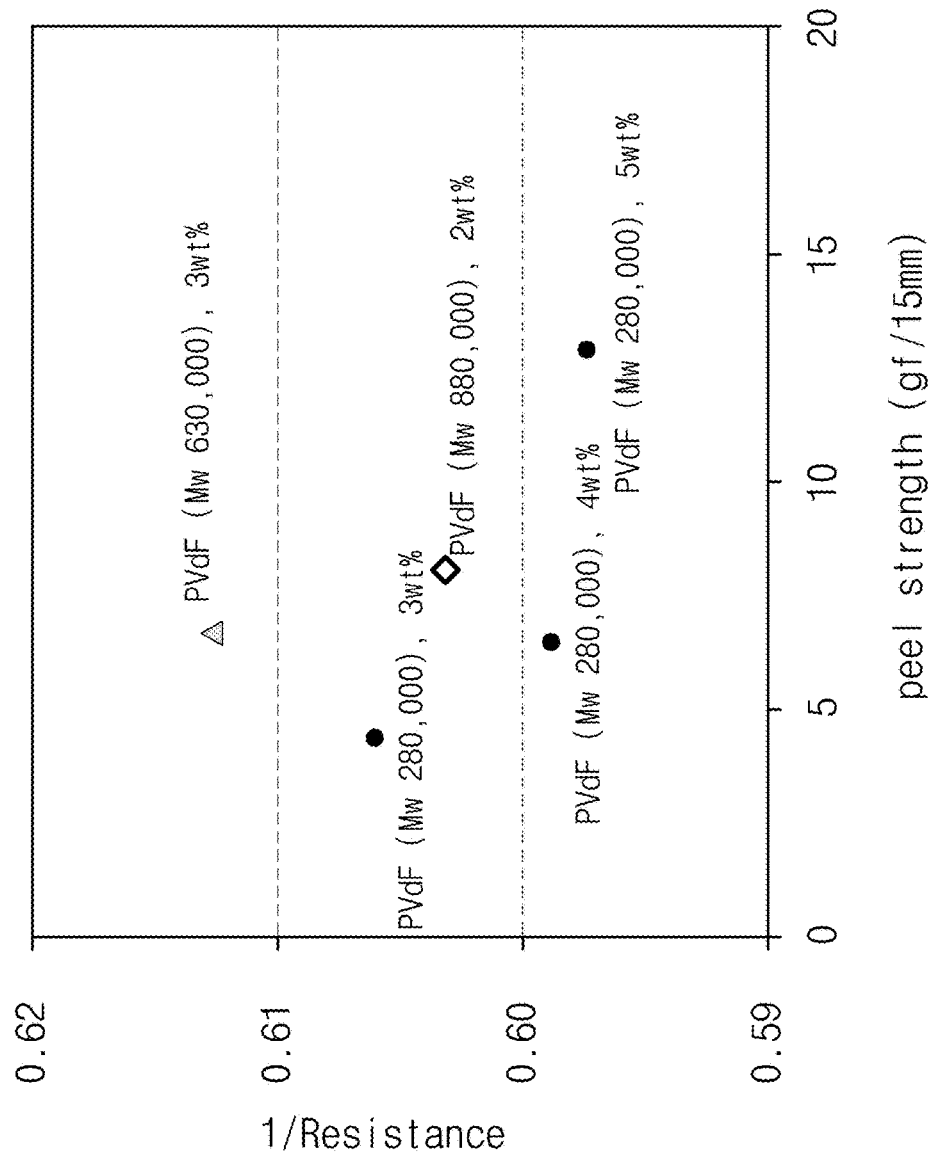
FIG. 3B is an enlarged graph of a circle indicated by a dotted line in FIG. 3A.

Also, DC-IR evaluation was performed on each prepared monocell to measure a resistance value. In this case, the DC-IR evaluation was performed by discharging the monocell at 2.5 C for 10 seconds at a state of charge (SOC) of 50%. The results thereof are presented in FIGS. 3A and 3B.

TABLE 4

|  |  | Reference Example | | | | | | | | |
|---|---|---|---|---|---|---|---|---|---|---|
|  |  | 8 | 9 | 10 | 11 | 12 | 13 | 14 | 15 | 16 |
| Amount of $LiNi_{0.6}Co_{0.2}Mn_{0.2}O_2$ positive electrode active material (wt %) |  | 94.5 | 93.5 | 92.5 | 94.5 | 93.5 | 92.5 | 94.5 | 93.5 | 92.5 |
| Conductive agent (wt %) | Acetylene black particulate conductive agent | 1 | 1 | 1 | 1 | 1 | 1 | 1 | 1 | 1 |
|  | Carbon nanotube fibrous conductive agent | 1 | 1 | 1 | 1 | 1 | 1 | 1 | 1 | 1 |
|  | Graphite plate-shaped conductive agent | 0.5 | 0.5 | 0.5 | 0.5 | 0.5 | 0.5 | 0.5 | 0.5 | 0.5 |
| Crystalline binder | PVdF content (wt %) | 3 | 4 | 5 | 3 | 4 | 5 | 2 | 3 | 4 |
|  | Mw (g/mol) | 280,000 | 280,000 | 280,000 | 630,000 | 630,000 | 630,000 | 880,000 | 880,000 | 880,000 |

From the experimental results, for the same amount of the PVdF, the resistance as well as the adhesion was increased as the weight-average molecular weight of the PVdF crystalline binder was increased, and, for the same weight-average molecular weight, the adhesion was increased as the amount of the PVdF was increased, but the resistance was reduced. In particular, with respect to Reference Examples 8 to 10 using the PVdF having a weight-average molecular weight of 280,000 g/mol, adhesion of the PVdF itself was excessively low despite the increased amount, and Reference Examples 14 to 16 using the PVdF having a weight-average molecular weight of 880,000 g/mol exhibited excellent adhesion by themselves, but, in a case in which the amount of the PVdF exceeded a predetermined level, the resistance characteristics as well as the adhesion were significantly reduced. The reason for this is that the high molecular weight crystalline binder not only had low dispersibility by itself, but the dispersibility was also significantly reduced as the amount thereof was increased. Form the above results, in consideration of the effects of the use of the crystalline binder on the adhesion and resistance characteristics, it may be understood that the weight-average molecular weight and amount of the crystalline binder must be optimized.

Experimental Example 3: Observation of Pore Structure in Electrode

Cross sections of the positive electrodes prepared in Examples 1 and 2 and Comparative Example 1 were observed using a scanning electron microscope (SEM). The results thereof are presented in FIGS. 4A to 6B.

Figure 4A:
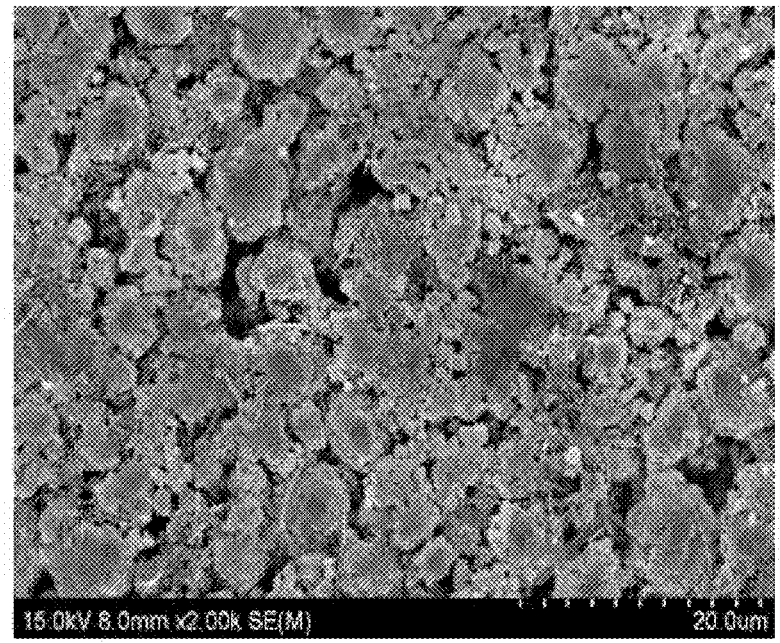
FIG. 4A is a scanning electron microscope (SEM) image of a cross section of a positive electrode material mixture prepared in Example 1.
Figure 4B:
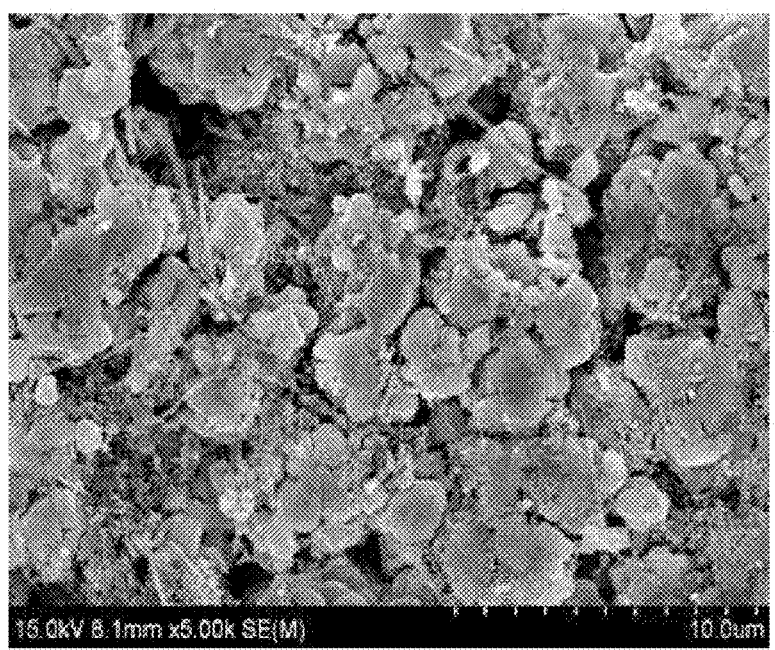
FIG. 4B is an enlarged portion of FIG. 4A.
Figure 5A:
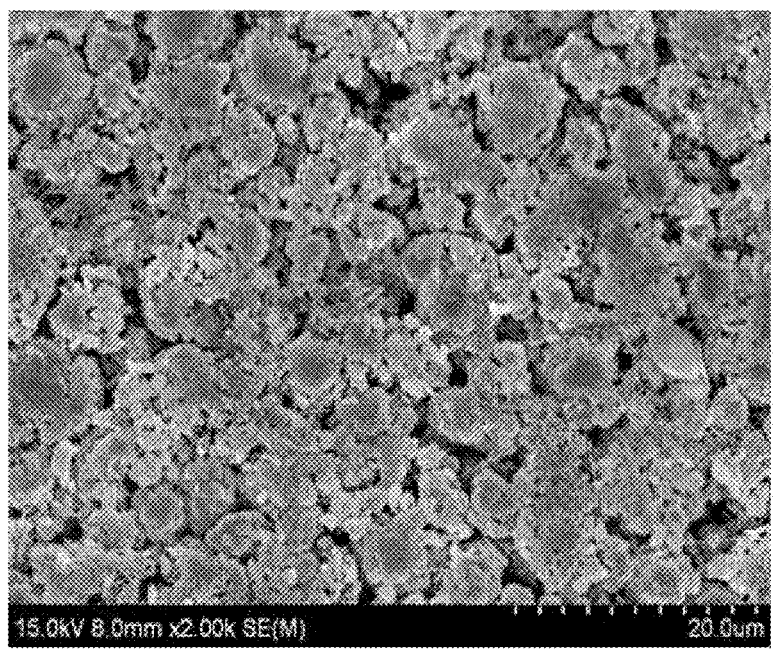
FIG. 5A is an SEM image of a cross section of a positive electrode material mixture prepared in Example 2.
Figure 5B:
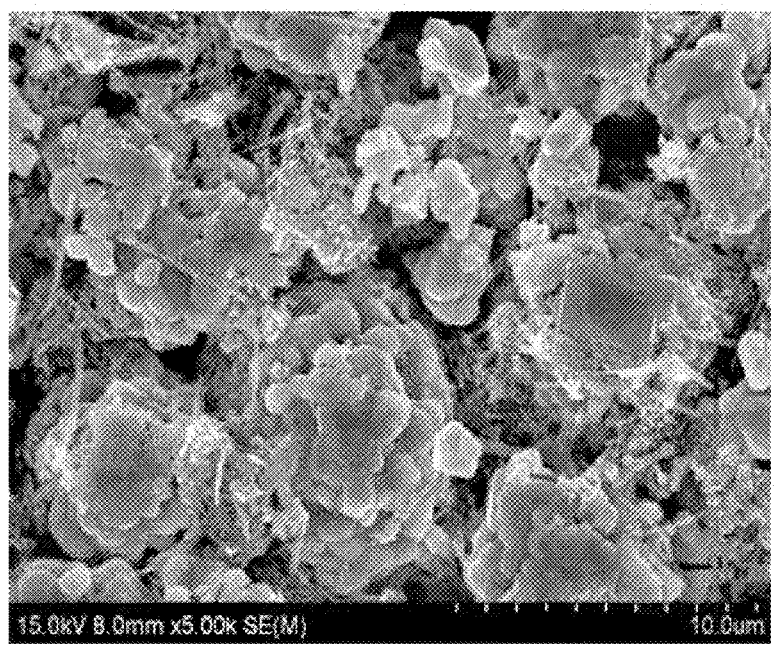
FIG. 5B is an enlarged portion of FIG. 5A.
Figure 6A:
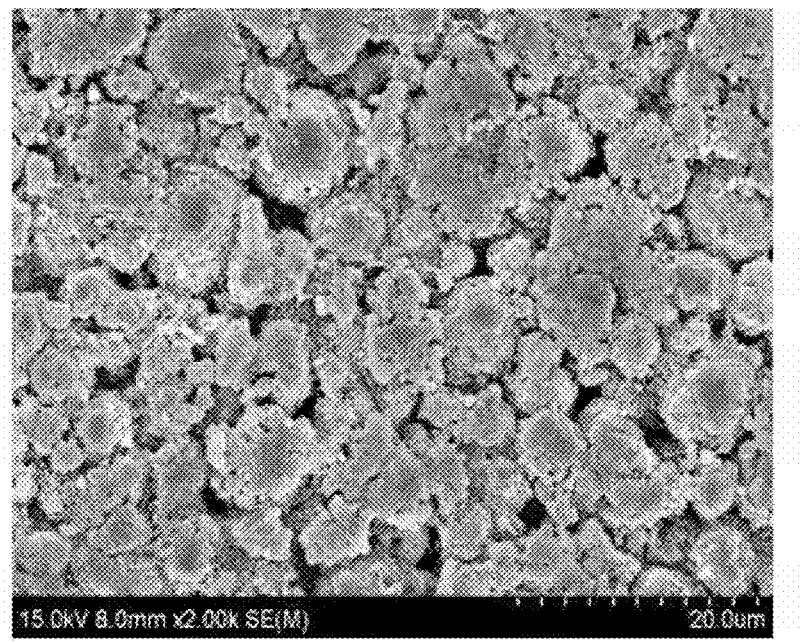
FIG. 6A is an SEM image of a cross section of a positive electrode material mixture prepared in Comparative Example 1.
Figure 6B:
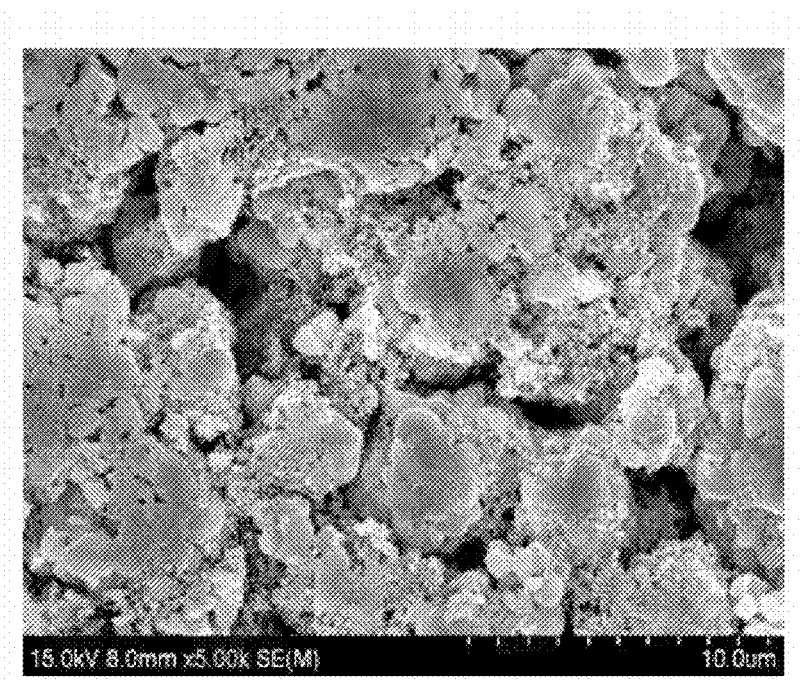
FIG. 6B is an enlarged portion of FIG. 6A.

FIG. 4A is a scanning electron microscope (SEM) image of the cross section of the positive electrode material mixture layer prepared in Example 1, and FIG. 4B is an enlarged portion of FIG. 4A. FIG. 5A is an SEM image of the cross section of the positive electrode material mixture prepared in Example 2, FIG. 5B is an enlarged portion of FIG. 5A, FIG. 6A is an SEM image of the cross section of the positive electrode material mixture prepared in Comparative Example 1, and FIG. 6B is an enlarged portion of FIG. 6A.

From the experimental results, in the SEM image of Comparative Example 1 in which the fibrous conductive agent and the plate-shaped conductive agent were not included, since dispersibility between the particles was not secured, agglomeration of the conductive particles were frequently observed. However, in the SEM images of Examples 1 and 2 in which the fibrous conductive agent and the plate-shaped conductive agent as well as the particulate conductive agent were included, since the dispersibility was secured by including a relatively smaller amount of the particulate conductive agent than Comparative Example 1, it may be confirmed that the fibrous and plate-shaped conducive agents connected the particulate conductive agent particles.

From the above results, since the positive electrode material mixture according to the preset invention included the particulate conductive agent, the fibrous conductive agent, and the plate-shaped conducive agent, the particulate conductive agent may maintain the pore structure between the particles through the securement of the dispersibility of the particles in the electrode and the conductive network in the electrode may be easily formed by the fibrous and plate-shaped conducive agents. As a result, it may be understood that, since porosity was improved, the intercalation/deintercalation of lithium ions were facilitated to improve ion transport ability. Also, it may be understood that, since electron transport ability was improved by the formation of the conductive network in the electrode, the battery characteristics may be improved when used in the battery.

Experimental Example 4: Pore Distribution Evaluation

Figure 7:
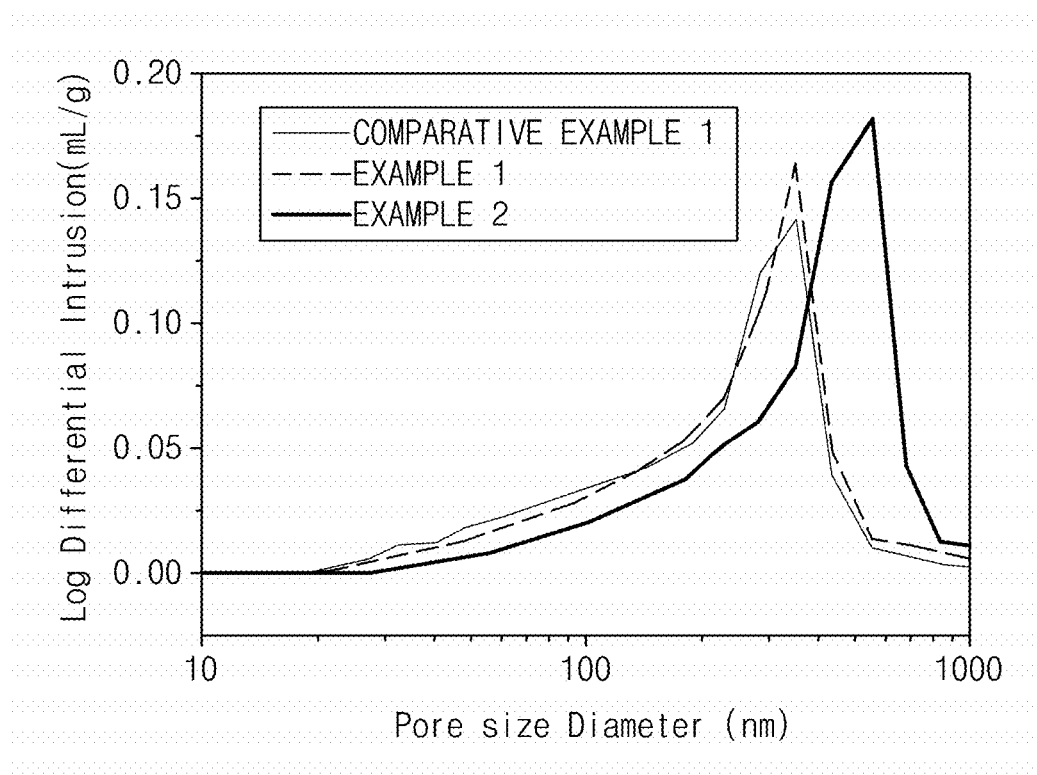
FIG. 7 illustrates the results of investigating pore size distribution in the positive electrode material mixtures prepared in Examples 1 and 2 and Comparative Example 1.

In order to investigate changes in pore distribution in the electrode depending on the inclusion of the particulate conductive agent, the fibrous conductive agent, and the plate-shaped conductive agent, pore size distributions (PSD), specifically, pore sizes of the positive electrode material mixture layers of Examples 1 and 2 and Comparative Example 1 were measured from a volume of mercury (Hg) intruded into pores according to pressure using the mercury, and the results thereof are presented in FIG. 7 and Table 5.

TABLE 5

|  | Comparative Example 1 | Example 1 | Example 2 |
|---|---|---|---|
| Maximum peak pore distribution diameter (nm) | 350.4 | 349.6 | 553.7 |

From the experimental results, it may be understood that, with respect to Examples 1 and 2 including the fibrous and plate-shaped conducive agents as well as the particulate conductive agent, it was more advantageous to secure pores in the positive electrode material mixtures. Specifically, the positive electrode material mixture of Example 1 had a distribution diameter at the maximum peak which was equivalent to that of Comparative Example 1, but an amount of pores having a large diameter was larger. Also, the positive electrode material mixture of Example 2 not only included a larger amount of pores having a large diameter than Comparative Example 1, but also had a largest distribution diameter at the maximum peak in comparison to the positive electrode material mixtures of Example 1 and Comparative Example 1. Furthermore, when three types of the conductive agents were used under the same condition, since the amount of the positive electrode active material in the positive electrode material mixture was relatively large, porosity equivalent to that of Example 1 was achieved, but a ratio of large pores was higher and a ratio of small pores was lower than Example 1.

Experimental Example 5: Electrode Sheet Resistance Evaluation

In order to evaluate whether or not internal resistance of the electrode was decreased by including all of the particulate conductive agent, the fibrous conductive agent, and the plate-shaped conductive agent, sheet resistance of each electrode prepared by using the positive electrode material mixtures of Examples 1 and 2 and Comparative Example 1 was measured by using a four-point probe. When the sheet resistance was measured, current and voltage were measured by using 4 probes arranged in a row at an interval of 1 mm, and the sheet resistance was determined therefrom. The results thereof are presented in FIG. 8.

Figure 8:
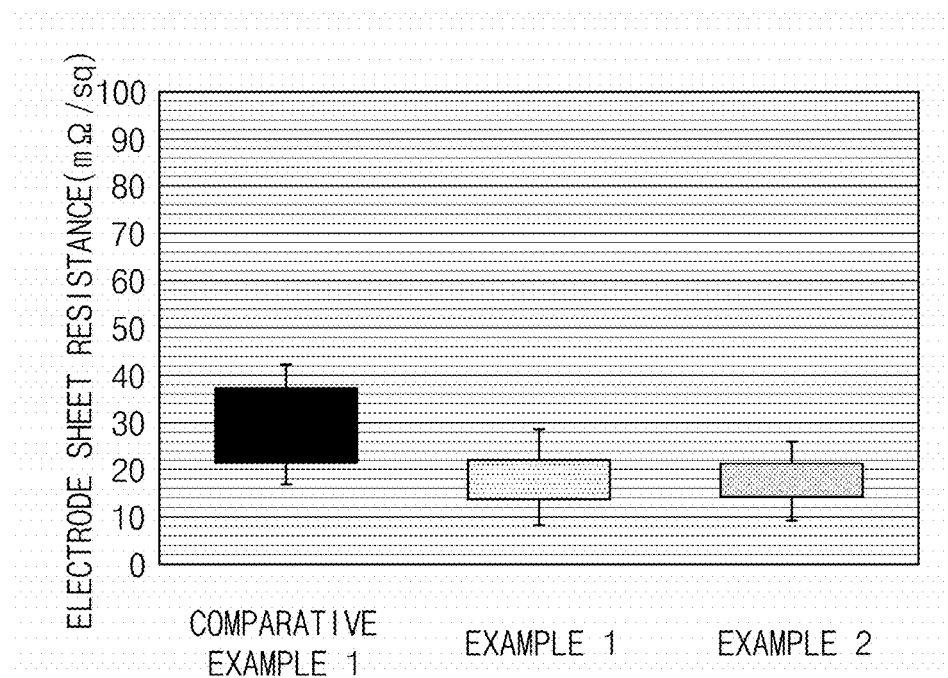
FIG. 8 is a graph illustrating the measurement results of sheet resistance of positive electrodes including the positive electrode material mixtures prepared in Examples 1 and 2 and Comparative Example 1.

Referring to FIG. 8, the electrode of Comparative Example 1 only containing the particulate conductive agent had a resistance of a minimum of about 21 m/sq to a maximum of about 38 m/sq and a deviation was large, but, with respect to Examples 1 and 2 including the fibrous and plate-shaped conducive agents as well as the particulate conductive agent, deviations of resistance values were small, ranging from about 14 m/sq to about 22 m/sq, and absolute values of the resistance values were also significantly lower than that of Comparative Example 1.

From the above results, it may be confirmed that, since the fibrous and plate-shaped conducive agents as well as the particulate conductive agent were included, the pores in the electrode may be secured and, simultaneously, the conductive network may be easily formed, and thus, the internal resistance of the electrode may be reduced.

Experimental Example 6: Output Characteristics Evaluation at Room Temperature In order to evaluate performances of the lithium secondary batteries prepared in Examples 1 and 2 and Comparative Example 1, a current of 6.5 C was allowed to flow for 10 seconds for each state of charge (SOC) at room temperature (25° C.). Charge and discharge were performed at the same current. Charge resistance (R_cha) and discharge resistance (R_dis) were calculated from voltage drops generated, and output characteristics were evaluated therefrom. The evaluation was repeated twice, and the results thereof are presented in FIGS. 9A and 9B.

Figure 9A:
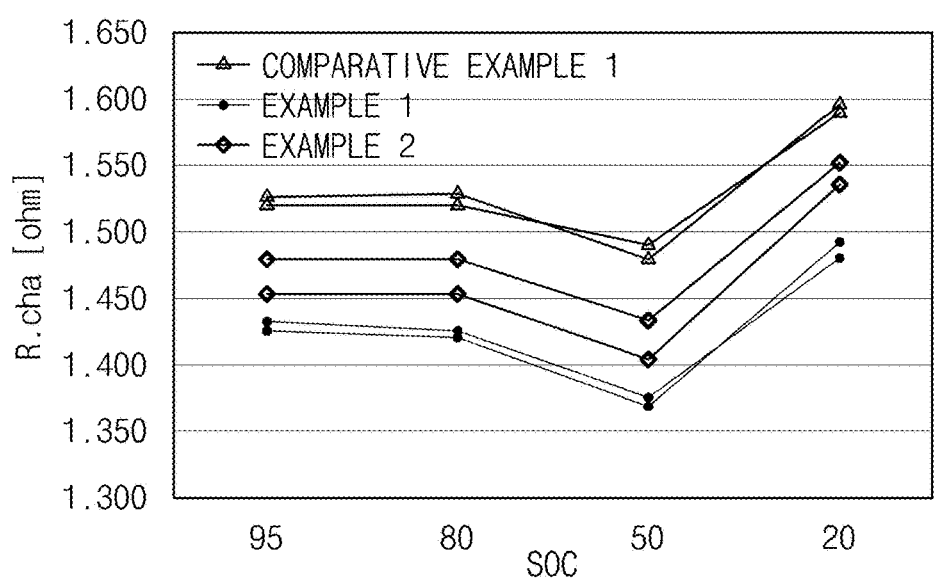
FIGS. 9A and 9B are graphs respectively illustrating the results of evaluating output characteristics for each state of charge (SOC) during charge and discharge of batteries including the positive electrode material mixtures prepared in Examples 1 and 2 and Comparative Example 1.
Figure 9B:
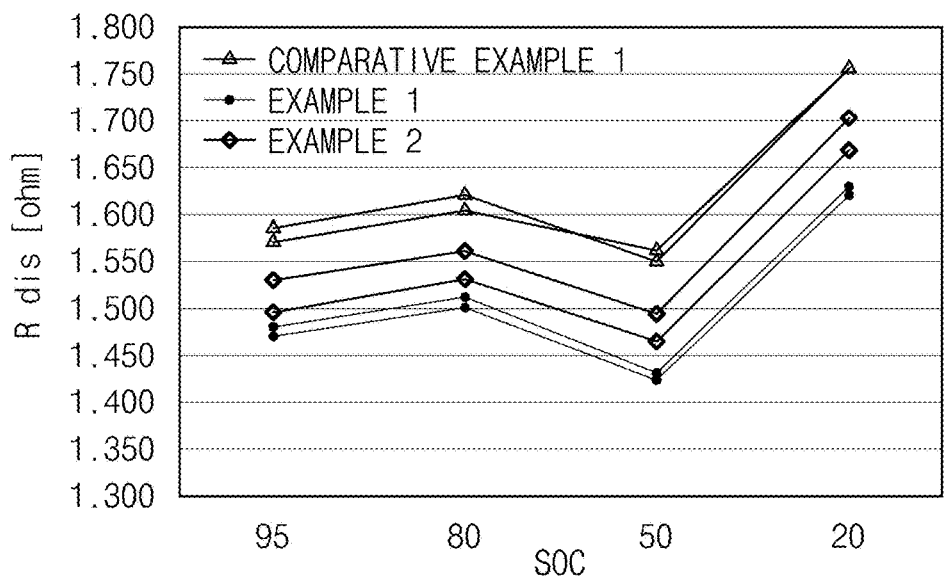

FIG. 9A is a graph illustrating the results of evaluating output characteristics for each SOC during the charge of the batteries including the positive electrode material mixtures prepared in Examples 1 and 2 and Comparative Example 1, and FIG. 9B is a graph illustrating the results of evaluating output characteristics for each SOC during the discharge of the batteries including the positive electrode material mixtures prepared in Examples 1 and 2 and Comparative Example 1.

From the experimental results, the batteries of Examples 1 and 2, which were prepared by using the positive electrode material mixtures including the fibrous and plate-shaped conducive agents as well as the particulate conductive agent, had significantly improved output characteristics at room temperature in comparison to the battery of Comparative Example 1. Also, the battery of Example 1 had better output characteristics than the battery of Example 2.

Figure 10:
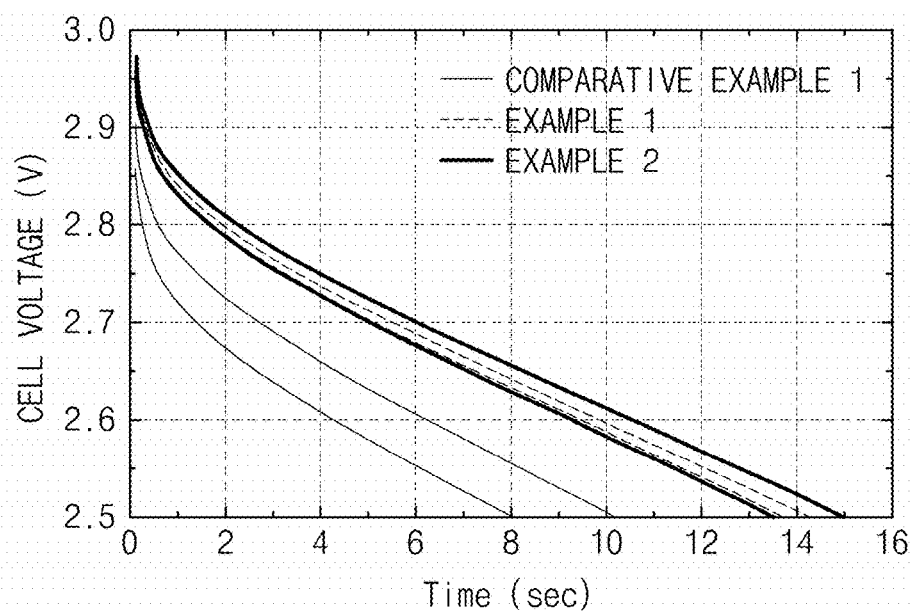
FIG. 10 illustrates the results of investigating low-temperature (−20° C.) output characteristics of batteries including the positive electrode material mixtures prepared in Examples 1 and 2 and Comparative Example 1.

Experimental Example 7: Output Characteristics Evaluation at Low Temperature A current of 150 mA was supplied to the lithium secondary batteries prepared in Examples 1 and 2 and Comparative Example 1 for 10 seconds at 100% SOC at −20° C. Voltage drops generated were measured, and low-temperature outputs were evaluated therefrom. The evaluation was repeated twice, and the results thereof are presented in FIG. 10.

From the experimental results, the batteries of Examples 1 and 2, which were prepared by using the positive electrode material mixtures including the fibrous and plate-shaped conducive agents as well as the particulate conductive agent, had excellent low-temperature output characteristics in comparison to the battery of Comparative Example 1.

As illustrated in Experimental Examples 6 and 7, the battery of Example 2 had slightly lower output characteristics at room temperature than the battery of Example 1, but had low-temperature output characteristics equivalent to those of the battery of Example 1. The reason for this is that, since the battery of Example 2 included a larger amount of the large pores in the positive electrode material mixture, the pore structure in the positive electrode material mixture was improved to improve the low-temperature output characteristics.

Experimental Example 8: Output Characteristics Evaluation after High-Temperature Storage of Lithium Secondary Battery After storing the lithium secondary batteries of Examples 1 and 2 and Comparative Example 1 at 60° C. for 3 weeks and 6 weeks, a current of 5C was allowed to flow for 10 seconds at 50% SOC. A change in AC resistance (Delta R) and a change in voltage (Delta V) generated were measured. The results thereof are presented in Table 6 below.

TABLE 6

|  | Initial stage | | After 3 weeks | | | | After 6 weeks | | | |
| --- | --- | --- | --- | --- | --- | --- | --- | --- | --- | --- |
|  | Voltage (V) | Resistance (mΩ) | Voltage (V) | Resistance (mΩ) | Delta V (V) | Delta R (mΩ) | Voltage (V) | Resistance (mΩ) | Delta V (V) | Delta R (mΩ) |
| Comparative Example 1 | 4.1346 | 545.9 | 4.0883 | 712.6 | 0.0463 | 166.7 | 4.0727 | 788 | 0.0619 | 242.1 |
| Example 1 | 4.1336 | 463.7 | 4.0845 | 548.3 | 0.0491 | 84.6 | 4.0677 | 602 | 0.0659 | 138.3 |
| Example 2 | 4.1334 | 532.9 | 4.0878 | 655.7 | 0.0456 | 122.8 | 4.0730 | 720 | 0.0604 | 187.1 |

From the experimental results, with respect to the batteries of Examples 1 and 2, an increase in resistance due to the high-temperature storage had slowed down in comparison to the battery of Comparative Example 1. The reason for this is that the pore structure in the positive electrode material mixture was improved due to the fibrous conductive agent included in the positive electrode material mixture and the electrically conductive network was also more effectively maintained even during the high-temperature storage.

Experimental Example 9: Adhesion Evaluation

Figure 11:
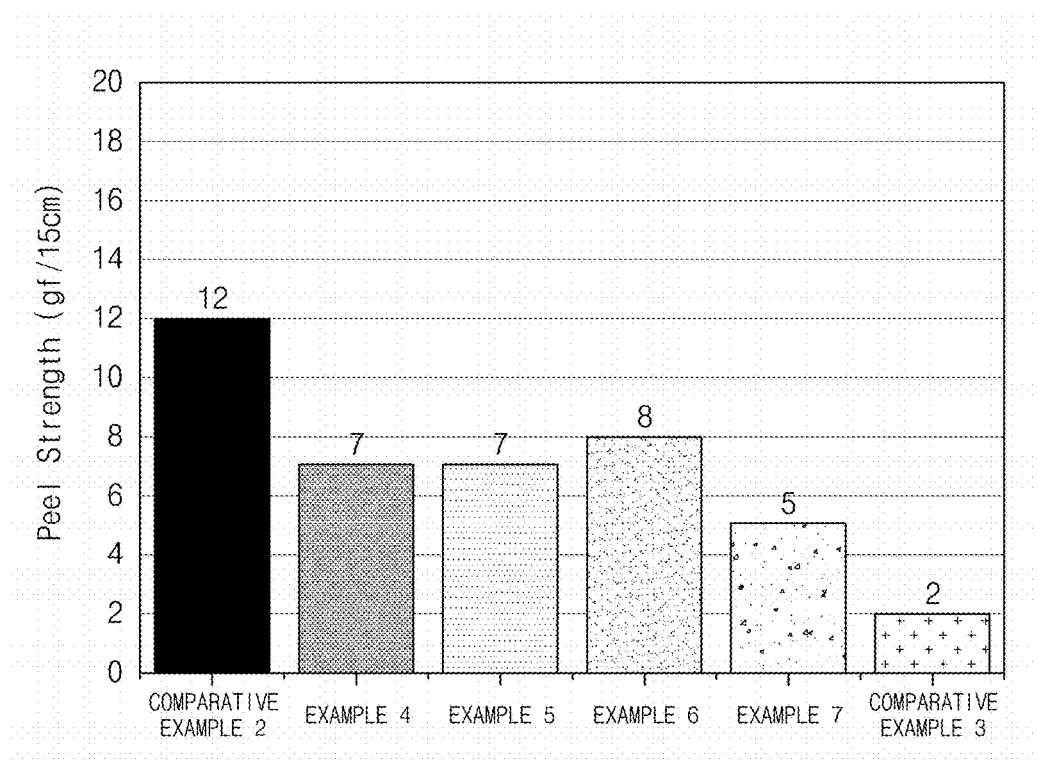
FIG. 11 is a graph illustrating the results of evaluating adhesion of positive electrodes prepared in Examples 4 to 7 and Comparative Examples 2 and 3.

Adhesion between the positive electrode material mixture layer and the positive electrode collector was evaluated for the positive electrodes prepared in Examples 4 to 7 and Comparative Examples 2 and 3 by a 180-degree peel test. The results thereof are presented in FIG. 11.

From the experimental results, the positive electrodes of Examples 4 to 6, in which three types of the conductive agents having shape anisotropy were used and the amorphous binder and the crystalline binder, which satisfied the Mw ranges of the present invention, were mixed and used in ratios of 9:1 and 4:1, exhibited low adhesion performance in comparison to the positive electrode of Comparative Example 2 in which the high molecular weight crystalline binder having excellent adhesion performance was used alone, but exhibited better adhesion performance than Comparative Example 3 in which NBR was used alone as the amorphous binder.

Experimental Example 10: Cell Resistance Evaluation

Figure 12:
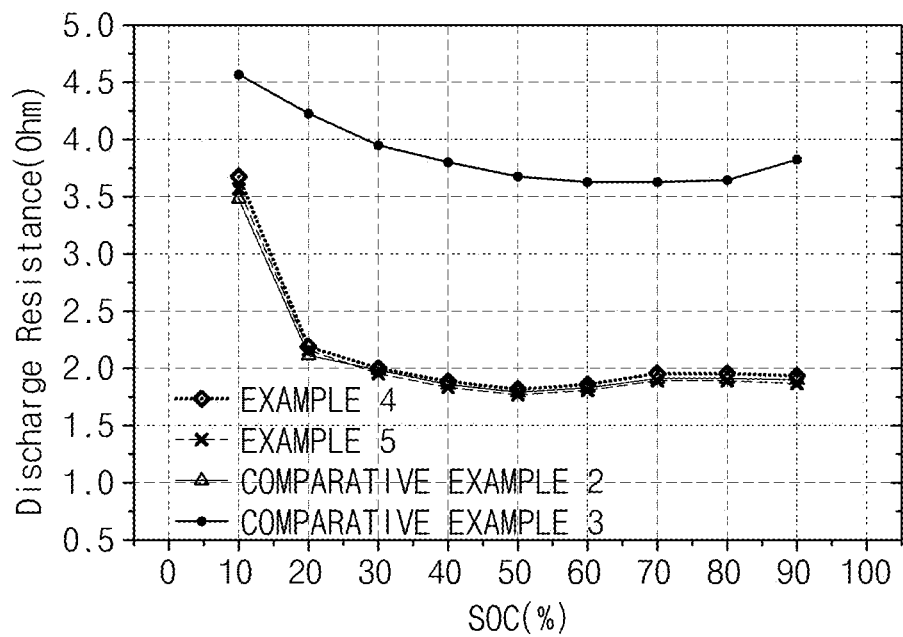
FIG. 12 is a graph illustrating the results of evaluating resistance characteristics of lithium secondary batteries prepared in Examples 4 and 5 and Comparative Examples 2 and 3.

A current of 2.5 C was supplied to the lithium secondary batteries prepared in Examples 4 and 5 Comparative Examples 2 and 3 for 30 seconds from 10% SOC to 100% SOC for every interval of 10% at room temperature (25° C.). A voltage drop was generated due to the high current, and discharge resistance may be calculated therefrom. The results thereof are presented in FIG. 12.

From the experimental results, the lithium secondary battery of Comparative Example 3 including the positive electrode, in which NBR was used alone as the amorphous binder, had the largest resistance, and the lithium secondary batteries of Examples 4 and 5 including the positive electrodes, in which three types of the conductive agents having shape anisotropy were used and the amorphous binder and the crystalline binder, which satisfied the Mw ranges of the present invention, were mixed and used in ratios of 9:1 and 4:1, exhibited an equivalent level of resistance characteristics to the lithium secondary battery of Comparative Example 2 including the positive electrode in which the high molecular weight crystalline binder having excellent adhesion performance was used alone.

The invention claimed is:

1. A positive electrode material mixture comprising:
a positive electrode active material;
a conductive agent; and
a binder,
wherein the conductive agent comprises a particulate conductive agent, a fibrous conductive agent, and a plate-shaped conductive agent, and
the binder comprises a crystalline binder having a weight-average molecular weight of 500,000 g/mol to 900,000 g/mol; and an amorphous binder having a weight-average molecular weight of 200,000 g/mol to 400,000 g/mol.

2. The positive electrode material mixture of claim 1, wherein the conductive agent comprises 30 parts by weight to 500 parts by weight of the fibrous conductive agent and 15 parts by weight to 50 parts by weight of the plate-shaped conductive agent based on 100 parts by weight of the particulate conductive agent.

3. The positive electrode material mixture of claim 1, wherein the particulate conductive agent comprises primary particles having an average particle diameter ($D_{50}$) of 10 nm to 45 nm and a specific surface area of 40 m$^2$/g to 170 m$^2$/g.

4. The positive electrode material mixture of claim 1, wherein the particulate conductive agent comprises at least one selected from the group consisting of carbon black, acetylene black, Ketjen black, channel black, furnace black, lamp black, thermal black, and Denka black.

5. The positive electrode material mixture of claim 1, wherein the fibrous conductive agent has an aspect ratio of 20 to 100.

6. The positive electrode material mixture of claim 1, wherein the fibrous conductive agent comprises at least one selected from the group consisting of carbon nanorods, carbon nanotubes, and carbon nanofibers.

7. The positive electrode material mixture of claim 1, wherein the fibrous conductive agent comprises carbon nanotubes having a diameter of 100 nm to 200 nm, a length of 3 μm to 10 μm, and a specific surface area of 5 m$^2$/g to 30 m$^2$/g.

8. The positive electrode material mixture of claim 1, wherein the plate-shaped conductive agent comprises a plurality of pores, has a specific surface area of 200 m$^2$/g to 400 m$^2$/g, and has a particle size distribution in which $D_{50}$ is in a range of 2 μm to 4 μm and $D_{90}$ is in a range of 10 μm to 15 μm.

9. The positive electrode material mixture of claim 1, wherein the plate-shaped conductive agent has a ratio ($I_D/I_G$) of maximum peak intensity of D band at a frequency of 1,340 nm to 1,360 nm to maximum peak intensity of G band at a frequency of 1,575 nm to 1,600 nm, which is obtained by Raman spectroscopy using a laser with a wavelength of 514.5 nm, of 0.5 to 1.0.

10. The positive electrode material mixture of claim 1, wherein the plate-shaped conductive agent comprises one selected from the group consisting of natural graphite and artificial graphite or a mixture of two or more thereof.

11. The positive electrode material mixture of claim 1, wherein the crystalline binder has a degree of crystallinity of 35% to 50%.

12. The positive electrode material mixture of claim 1, wherein the crystalline binder comprises an H—H inverse unit in a molecule in an amount of 5 mol % to 12 mol %.

13. The positive electrode material mixture of claim 1, wherein the crystalline binder comprises a fluorine-based binder, and the amorphous binder comprises a rubber-based binder.

14. The positive electrode material mixture of claim 1, wherein the crystalline binder comprises one selected from the group consisting of polyvinylidene fluoride, polyhexafluoropropylene, polytetrafluoroethylene, and a copolymer of polyhexafluoropropylene-polyvinylidene fluoride, or a mixture of two or more thereof.

15. The positive electrode material mixture of claim 1, wherein the amorphous binder comprises one selected from the group consisting of a styrene-butadiene rubber, a nitrile-butadiene rubber, an acrylonitrile-butadiene rubber, and an acrylonitrile-butadiene-styrene rubber, or a mixture of two or more thereof.

16. The positive electrode material mixture of claim 1, wherein the binder comprises the crystalline binder and the amorphous binder in a mixing weight ratio of 1:1 to 12:1.

17. The positive electrode material mixture of claim 1, wherein the amorphous binder is included in an amount such that SOP, a percentage of an amount of the amorphous binder to an amount of the particulate conductive agent which is calculated according to Equation 1, is 20% or less:

SOP (%)=(weight of the amorphous binder/weight of the particulate conductive agent)×100. [Equation 1]

18. The positive electrode material mixture of claim 1, wherein the positive electrode active material comprises a compound of Formula 1:

$Li_{1+a}Ni_xCo_yMn_zM_wO_2$ [Formula 1]

wherein M is selected from the group consisting of aluminum (Al), copper (Cu), iron (Fe), vanadium (V), chromium (Cr), titanium (Ti), zirconium (Zr), zinc (Zn), tantalum (Ta), niobium (Nb), magnesium (Mg), boron (B), tungsten (W), and molybdenum (Mo), and a, x, y, z, and w represent an atomic fraction of each independent element, wherein −0.5≤a≤0.5, 0<x<1, 0<y<1, 0<z<1, 0≤w≤1, and y+z≤x.

19. A positive electrode for a secondary battery, the positive electrode comprising the positive electrode material mixture of claim 1.

20. A lithium secondary battery comprising the positive electrode of claim 19.

* * * * *